United States Patent
Park et al.

(10) Patent No.: US 10,958,833 B2
(45) Date of Patent: Mar. 23, 2021

(54) ELECTRONIC DEVICE FOR CONTROLLING FRAME RATE OF IMAGE SENSOR AND METHOD THEREOF

(71) Applicant: Samsung Electronics Co., Ltd., Suwon-si (KR)

(72) Inventors: Chansik Park, Suwon-si (KR); Hyungsuk Kim, Suwon-si (KR); Jaehun Cho, Suwon-si (KR); Jungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 13 days.

(21) Appl. No.: 16/590,858

(22) Filed: Oct. 2, 2019

(65) Prior Publication Data

US 2020/0228706 A1 Jul. 16, 2020

(30) Foreign Application Priority Data

Jan. 11, 2019 (KR) .................. 10-2019-0003616

(51) Int. Cl.
*H04N 5/232* (2006.01)
*H04N 5/235* (2006.01)
(Continued)

(52) U.S. Cl.
CPC ....... *H04N 5/23232* (2013.01); *H04N 5/2258* (2013.01); *H04N 5/2353* (2013.01);
(Continued)

(58) Field of Classification Search
CPC .. H04N 5/2258; H04N 5/232; H04N 5/23232; H04N 5/232411; H04N 5/23287;
(Continued)

(56) References Cited

U.S. PATENT DOCUMENTS 8,319,859 B2 11/2012 Kim et al.
8,792,019 B2 * 7/2014 Yuyama ............. H04N 5/23219
348/239

(Continued)

FOREIGN PATENT DOCUMENTS

KR 10-1574205 B1 12/2015
KR 10-2017-009272 A 8/2017

OTHER PUBLICATIONS

International Search Report dated Jan. 30, 2020, issued in an International Application No. PCT/KR2019/012911.

*Primary Examiner* — Lin Ye
*Assistant Examiner* — Chriss S Yoder, III
(74) *Attorney, Agent, or Firm* — Jefferson IP Law, LLP

(57) ABSTRACT

An electronic device for controlling a frame rate and a method therefor are provided. The electronic device includes an image sensor, and a processor. The processor is configured to sequentially obtain a first image, a second image, and a third image through the image sensor at a first time interval, generate a synthesized image by using the first image and the third image, identify a similarity between the second image and the synthesized image, sequentially obtain a fourth image, a fifth image, and a sixth image through the image sensor, at a second time interval long than the first time interval, based on the similarity being equal to or greater than a first threshold value, and sequentially obtain the fourth image, the fifth image, and the sixth image through the image sensor, at the first time interval, based on the similarity being less than a first threshold value.

20 Claims, 16 Drawing Sheets

(51) Int. Cl.
   *H04N 5/247* (2006.01)
   *H04N 5/225* (2006.01)
   *H04N 5/907* (2006.01)
(52) U.S. Cl.
   CPC ........... *H04N 5/2354* (2013.01); *H04N 5/247* (2013.01); *H04N 5/907* (2013.01)
(58) Field of Classification Search
   CPC .... H04N 5/2353; H04N 5/2354; H04N 5/247; H04N 5/353; H04N 5/772; H04N 5/907
   See application file for complete search history.

(56) References Cited

U.S. PATENT DOCUMENTS

| | | | |
|---|---|---|---|
| 9,865,231 B2 | 1/2018 | Kim et al. | |
| 10,742,896 B2 * | 8/2020 | Takahashi | H04N 5/23229 |
| 2007/0139530 A1 | 6/2007 | Goffin | |
| 2007/0139543 A1 | 6/2007 | Goffin | |
| 2010/0053345 A1 | 3/2010 | Kim et al. | |
| 2010/0214439 A1 | 8/2010 | Oshima et al. | |
| 2011/0109796 A1 | 5/2011 | Subedar et al. | |
| 2011/0164146 A1 | 7/2011 | Chiang et al. | |
| 2011/0176028 A1 | 7/2011 | Toyoda | |
| 2013/0279590 A1 * | 10/2013 | Chen | H04N 19/513 |
| | | | 375/240.16 |
| 2015/0130823 A1 * | 5/2015 | Kim | G09G 3/3225 |
| | | | 345/522 |

* cited by examiner

: IMAGE FRAME OBTAINED FROM IMAGE SENSOR

: SYNTHESIZED IMAGE FRAME GENERATED FROM FRC, NOT USED IN ENCODING

: SYNTHESIZED IMAGE FRAME GENERATED FROM FRC, USED IN ENCODING

: IMAGE FRAME OBTAINED FROM IMAGE SENSOR

: SYNTHESIZED IMAGE FRAME GENERATED FROM FRC, NOT USED IN ENCODING

: SYNTHESIZED IMAGE FRAME GENERATED FROM FRC, USED IN ENCODING

ELECTRONIC DEVICE FOR CONTROLLING
FRAME RATE OF IMAGE SENSOR AND
METHOD THEREOF

CROSS-REFERENCE TO RELATED APPLICATION(S)

This application is based on and claims priority under 35 U.S.C. § 119 of a Korean patent application number 10-2019-0003616, filed on Jan. 11, 2019, in the Korean Intellectual Property Office, the disclosure of which is incorporated by reference herein its entirety.

BACKGROUND

1. Field

The disclosure relates to an electronic device for controlling a frame rate of an image sensor and a method thereof.

2. Description of Related Art

An electronic device may obtain image frames using an image sensor. The image sensor may obtain the image frames at specific time intervals, and a rate to obtain the image frames may be expressed as a frame rate. The frame rate may be referred to the number of frames per second (fps).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method for controlling a frame rate of an image sensor by using a frame rate converter.

When the frame rate of the image sensor increases, the number of image frames obtained at a specified time interval increases. Accordingly, although the electronic device may capture images of a subject rapidly moving, image quality of images may be degraded or the images look dark because the exposure time of the image sensor decreases.

The electronic device may increase the number of image frames by maintaining or increasing the exposure time through frame rate conversion. For example, the electronic device may maintain the frame rate (e.g., 320 fps) (i.e., maintain the exposure time) of the image sensor while increasing the frame rate (e.g., 480 fps) of a moving picture reproduced in the electronic device, by inserting an intermediate image frame between image frames obtained through the image sensor.

When the image sensor and a component (e.g., a frame rate converter) to perform the frame rate conversion operate independently from each other, unnecessary power consumption may occur or the image quality of an image (or a moving picture) may be degraded. For example, when the frame rate conversion is performed without separate feedback nevertheless there is present the difference in image quality between image frames, which are obtained through the image sensor, and an intermediate image frame generated through the frame rate converter, the image quality of an image (or a moving picture) reproduced in the electronic device may be degraded. For another example, when the frame rate conversion is performed in the situation that it is unnecessary to increase the frame rate, power consumption may be increased.

Additional aspects will be set forth in part in the description which follows and, in part, will be apparent from the description, or may be learned by practice of the presented embodiments.

In accordance with an aspect of the disclosure, an electronic device is provided. The electronic device may include an image sensor at least one processor. The at least one processor may be configured to sequentially obtain a first image, a second image, and a third image through the image sensor at a first time interval, generate a synthesized image by using the first image and the third image, identify a similarity between the second image and the synthesized image, sequentially obtain a fourth image, a fifth image, and a sixth image through the image sensor, at a second time interval long than the first time interval, based on the similarity being equal to or greater than a first threshold value, and sequentially obtain the fourth image, the fifth image, and the sixth image through the image sensor, at the first time interval, based on the similarity being less than the first threshold value.

In accordance with another aspect of the disclosure, a method of an electronic device is provided. The method may include sequentially obtaining a first image and a second image at a first time interval, generating a synthesized image using the first image and the second image, identifying a similarity between the second image and the synthesized image, sequentially obtaining a third image and a fourth image at a second time interval longer than the first time interval, based on the similarity being equal to or greater than a first threshold value, and sequentially obtaining the third image and the fourth image at the first time interval, based on the similarity being less than the first threshold value.

In accordance with another aspect of the disclosure, an electronic device is provided. The electronic device may include an image sensor and at least one processor. The at least one processor may be configured to sequentially obtain a first image and a second image through the image sensor at a first time interval, identify a similarity between the first image and the second image, sequentially obtain a third image and a fourth image through the image sensor at a second time interval longer than the first time interval, based on the similarity being equal to or greater than a first threshold value, and sequentially obtain the third image and the fourth image through the image sensor at the first time interval, based on the similarity being less than the first threshold value.

In accordance with another aspect of the disclosure, an electronic device is provided. The electronic device may include an image sensor, and at least one processor. The at least one processor may be configured to sequentially obtain a first image, a second image, and a third image through the image sensor at a first time interval, obtain a synthesized image corresponding to the third image, based on the first and second images, identify a similarity between the third image and the synthesized image, sequentially obtain a fourth image, a fifth image, and a sixth image through the image sensor at a second time interval longer than the first time interval based on the similarity being equal to greater than a first threshold value, and sequentially obtain the fourth image, the fifth image, and the sixth image through the image sensor at the first time interval, based on the similarity being less than the first threshold value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Hereinafter, various embodiments of the disclosure may be described with reference to accompanying drawings. However, those of ordinary skill in the art will understand that the disclosure is not limited to a specific embodiment, and modifications, equivalents, and/or alternatives on the various embodiments described herein can be variously made without departing from the scope and spirit of the disclosure.

Figure 1:
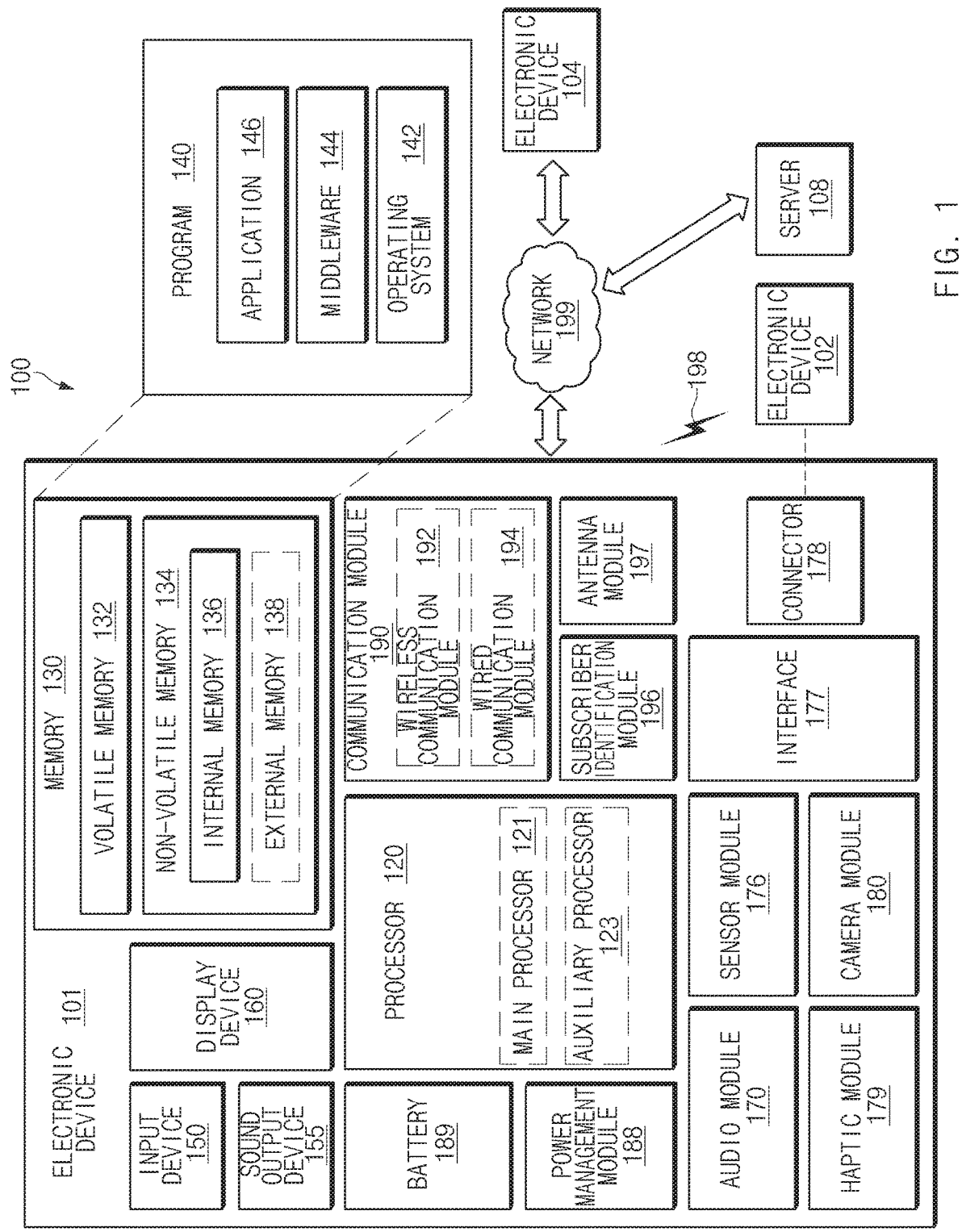
FIG. 1 illustrates a block diagram of an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal or connector 178 may include a connector via which the electronic device 101 may be physically connected with the external electronic device (e.g., the electronic device 102). According to an embodiment, the connecting terminal or connector 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2:
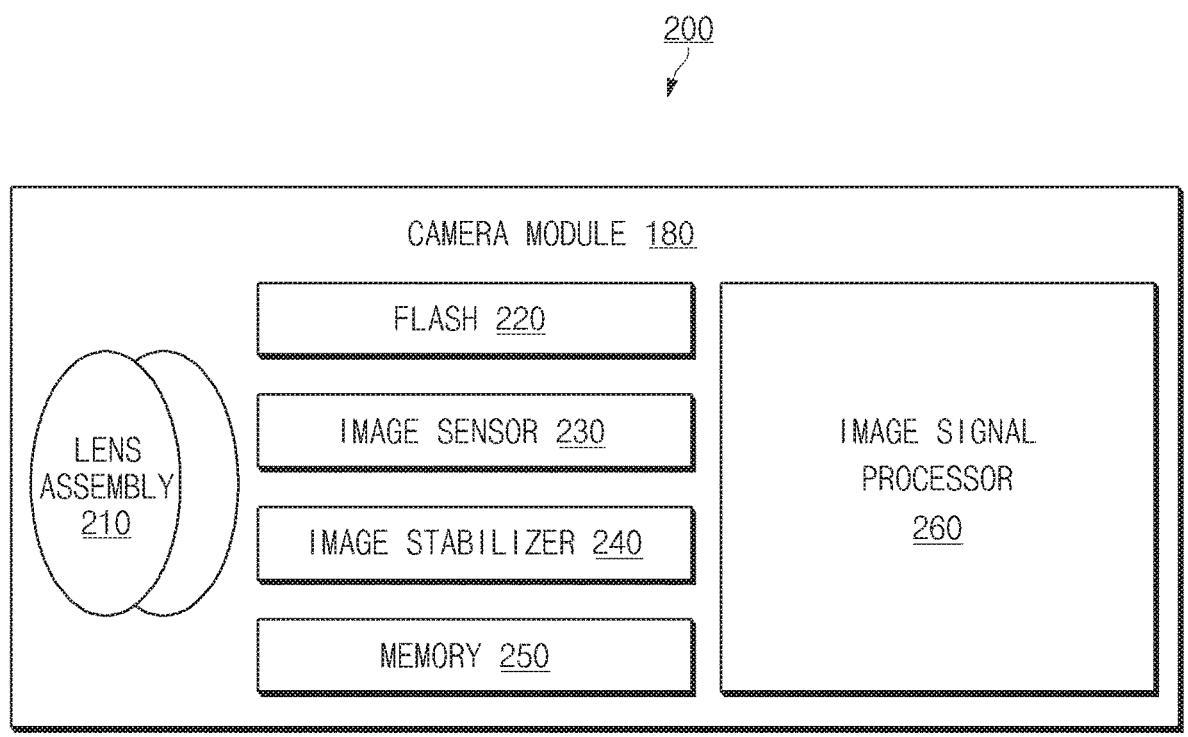
FIG. 2 is a block diagram of a camera module, according to an embodiment of the disclosure.

FIG. 2 is a block diagram 200 illustrating the camera module 180 according to an embodiment of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
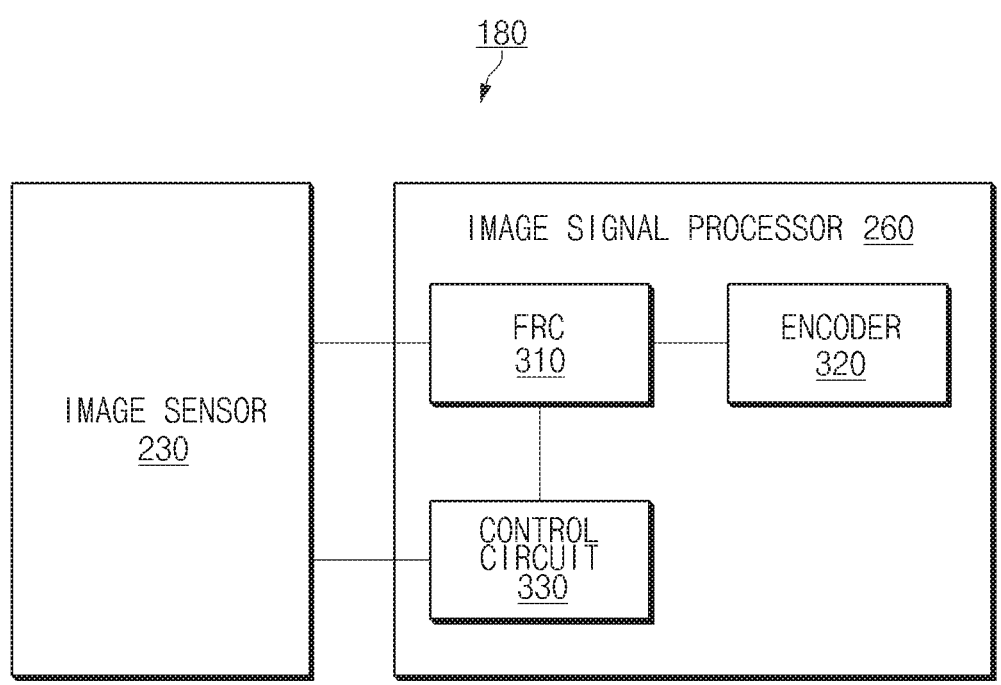
FIG. 3 illustrates a block diagram of a camera module including a frame rate converter and an encoder, according to an embodiment of the disclosure.

FIG. 3 illustrates a block diagram of the camera module 180 including a frame rate converter 310 and an encoder 320, according to an embodiment of the disclosure.

Referring to FIG. 3, the image signal processor (ISP) 260 (e.g., at least a portion of the processor 120 or the auxiliary processor 123 of FIG. 1) may include the frame rate converter (FRC) 310, the encoder 320, and a control circuitry 330. Each of the frame rate converter 310, the encoder 320, and the control circuitry 330 may be individually configured in hardware (or chip), or at least two of the frame rate converter 310, the encoder 320, and the control circuitry 330 may be configured in one module.

According to an embodiment, the frame rate converter 310 may perform frame rate conversion. The frame rate conversion may include an operation of generating a synthesized image based on at least one image frame obtained from the image sensor 230. In the disclosure, the image frame may be included in an image. For example, the frame rate converter 310 may generate a synthesized image frame ($N^{th}$ synthesized image frame; N is a natural image) corresponding to an $N^{th}$ image frame, based on an $(N-1)^{th}$ image frame and an $(N+1)^{th}$ image frame which are obtained from the image sensor 230.

Although FIG. 3 illustrates an embodiment in which the frame rate converter 310 is included in the image signal processor 260 as one component of the image signal processor 260, the frame rate converter 310 may be included in the image sensor 230 or may be configured in hardware separate from that of the image signal processor 260 according to another embodiment. According to another embodiment, the frame rate converter 310 may be included in the encoder 320 and may share some modules together with the encoder 320.

According to an embodiment, the encoder 320 may perform encoding based on at least one image frame (or the synthesized image frame) obtained from the image sensor 230 or the frame rate converter 310. The image signal processor 260 may generate a moving picture (or an image) by performing the encoding.

According to an embodiment, the control circuitry 330 may be operatively connected with the image sensor 230, the frame rate converter 310, and the encoder 320. According to an embodiment, the control circuitry 330 may control the frame rate of the image sensor 230, based on the similarity (correlation) between a synthesized image frame (e.g., $N^{th}$ synthesized image frame) generated from the frame rate converter 310 and an image frame (e.g., $N^{th}$ image frame) obtained from the image sensor 230

For example, when the similarity is equal to or greater than a specified threshold value, the control circuitry 330 may reduce the frame rate of the image sensor 230. Because the similarity between the synthesized image frame and the image frame obtained from the image sensor 230 is equal to or greater than the threshold value, even if the electronic device 101 generates a moving picture using the synthesized image frame, the image quality of the moving picture is not degraded. In addition to this, the moving picture is prevented from being darkly reproduced because the exposure time increases if the frame rate decreases. In addition, even if the exposure time of the image sensor 230 increases, the frame rate (or the frame rate of the encoded moving picture) of the moving picture reproduced in the electronic device 101 may be maintained, so the electronic device 101 seamlessly provides the moving picture of a subject, which rapidly moves.

For another example, if the similarity is less than the specified threshold value, the image quality of the moving picture may be degraded, so the control circuitry 330 may increase or maintain the frame rate of the image sensor 230.

Figure 4A:
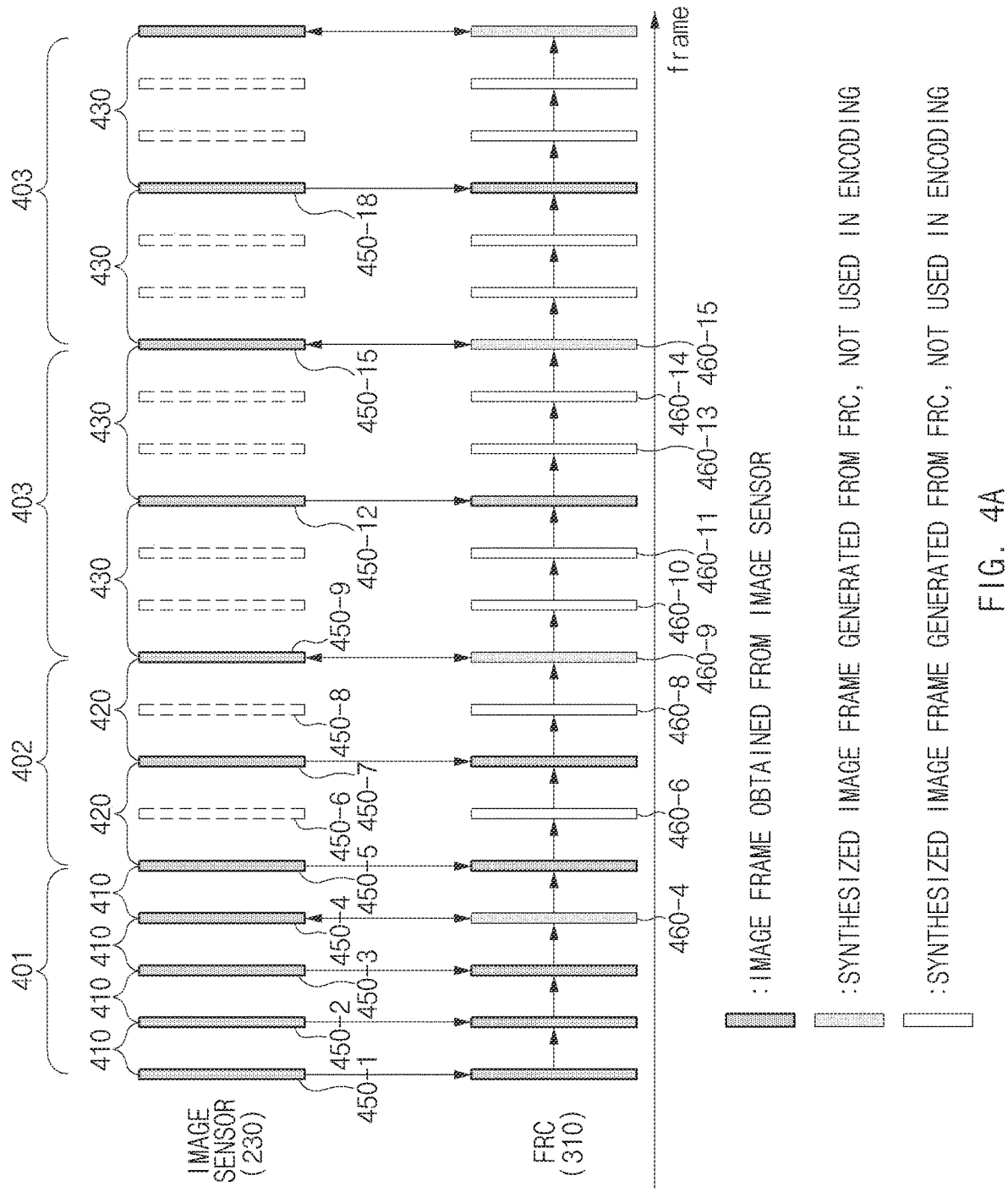
FIG. 4A illustrates an operation of an electronic device to reduce a frame rate of an image sensor, according to an embodiment of the disclosure.

FIG. 4A illustrates the operation of an electronic device to reduce a frame rate of the image sensor, according to an embodiment of the disclosure.

FIG. 4A illustrates an example in which synthesized image frames generated by the image signal processor 260 (e.g., the frame rate converter 310) are aligned in the sequence of image frames obtained by the image sensor 230.

Referring to FIG. 4A, the electronic device (e.g., the electronic device 101 of FIG. 1) may sequentially obtain a plurality of image frames at a first frame rate 401 (e.g., about 960 fps) through the image sensor 230. For example, the electronic device 101 may generate a plurality of images frames 450-1, 450-2, 450-3, 450-4, and 450-5 at a first specified time interval 410.

According to an embodiment, the electronic device 101 may generate a synthesized image frame (e.g., a synthesized image frame 460-4) corresponding an $N^{th}$ image frame 450-4 through the frame rate converter 310. According to an embodiment, the synthesized image frame may be generated based on an $(N-1)^{th}$ image frame (e.g., 450-3) and an $(N+1)^{th}$ image frame (e.g., 450-5).

According to an embodiment, the electronic device 101 may identify the similarity between the $N^{th}$ image frame (e.g., 450-4) and the synthesized image frame (e.g., 460-4) corresponding to the $N^{th}$ image frame. For example, the electronic device 101 may identify the similarity through the image signal processor 260 or the control circuitry 330. According to an embodiment, the electronic device 101 may identify the similarity based on at least one of Sum of Absolute Difference (SAD) or Magnitude of Absolute Difference (MAD) between the $N^{th}$ image frame and the synthesized image frame corresponding to the $N^{th}$ image frame. For example, the electronic device 101 may identify the similarity as being higher when the SAD or the MAD between the $N^{th}$ image frame and the synthesized image frame corresponding to the $N^{th}$ image frame is less than a specified threshold value. According to another embodiment, to reduce a time taken to identify the similarity, the electronic device 101 may compare features (or key points) of the image frames (e.g., the image frame 450-4 and the synthesized image frame 460-4) with each other, may compare between sub-sampled image frames, or compare only partial regions of the image frames.

According to an embodiment, the electronic device 101 may use the synthesized image frame corresponding to the $N^{th}$ image frame (e.g., 450-4) to identify the similarity. The electronic device 101 may use the $N^{th}$ image frame instead of the synthesized image frame corresponding to the $N^{th}$ image frame when encoding is performed to generate the moving picture. According to another embodiment, when the higher similarity is shown between the $N^{th}$ image frame and the synthesized image frame corresponding to the $N^{th}$ image (e.g., when the similarity is equal to or greater than the threshold value to be described), the electronic device 101 may use the synthesized image frame instead of the image frame when performing the encoding.

According to an embodiment, the electronic device 101 may control the frame rate of the image sensor 230 and the frame rate of the frame rate converter 310 based on the similarity. For example, when the similarity is equal to or greater than the specified threshold value, the electronic device 101 may change the frame rate of the image sensor 230 to a second frame rate 402 (e.g., about 480 fps) less than a first frame rate 401. In this case, the electronic device 101 may sequentially obtain image frames (e.g., 450-7 or 450-9) through the image sensor 230 at a second specified time interval 420 longer than the first specified time interval 410.

According to an embodiment, to maintain the frame rate (e.g., the first frame rate 401) of the moving picture reproduced from the electronic device 101, the electronic device 101 may perform the frame rate conversion through the frame rate converter 310. For example, the electronic device 101 may generate a synthesized image frame (460-6 or 460-8) at the timing (e.g., the timing at which the image frame 450-6 or 450-8 has to be generated) at which an image frame is not generated from the image sensor 230.

According to an embodiment, the electronic device 101 may perform an operation of controlling the frame rate of the image sensor 230 once more. For example, the electronic device 101 may generate a synthesized image frame (e.g., 460-9) corresponding to an $M^{th}$ image frame (e.g., 450-9) (M is a natural number larger than N) obtained from the image sensor 230, after the frame rate of the image sensor 230 is changed to the second frame rate 402. When the similarity between $M^{th}$ image frame and a synthesized image frame corresponding to the $M^{th}$ image frame is equal to or greater than a specified threshold value, the electronic device 101 may change the frame rate of the image sensor 230 to a third frame rate 403 (e.g., about 320 fps) less than the second frame rate 402. In this case, the electronic device 101 may sequentially obtain image frames (e.g., 450-12 or 450-15) through the image sensor 230 at a third specified time interval 430 longer than the second specified time interval 420.

According to an embodiment, the electronic device 101 may increase the frame rate of the frame rate converter 310 corresponding to that the frame rate of the image sensor 230 decreases. For example, the frame rate converter 310 may generate a plurality of synthesized image frames (e.g., 460-10 and 460-11, or 460-13 and 460-14) for the third specified time interval 430. The similar power consumption is required to generate synthesized image frames regardless of the number of synthesized image frames. However, the total power consumption may be reduced in the electronic device 101 if the frame rate of the image sensor 230 is reduced even if the frame rate of the frame rate converter 310 is increased, because some processes for image processing may be omitted when the frame rate of the image sensor 230 is reduced. According to an embodiment, the electronic device 101 may instantly change the frame rate based on the comparative result for the similarity. According to another embodiment, the electronic device 101 may change the frame rate after identifying the similarity tendency between a plurality of image frames. The changing of the frame rate after identifying the similarity tendency may improve the reliability of the synthesized image frame in higher-rate consecutive frames.

According to an embodiment, when the similarity is less than a specified threshold value, the electronic device 101 may maintain or increase the frame rate of the image sensor 230. For example, the electronic device 101 may generate a synthesized image frame 460-15 corresponding to a $K^{th}$ image frame (K is a natural number greater than M) (e.g., an image frame 450-15). When the similarity between the $K^{th}$ image frame and the synthesized image frame corresponding to the $K^{th}$ image frame is less than the specified threshold value, the electronic device 101 may maintain the frame rate (e.g., the third frame rate) of the image sensor 230.

Figure 4B:
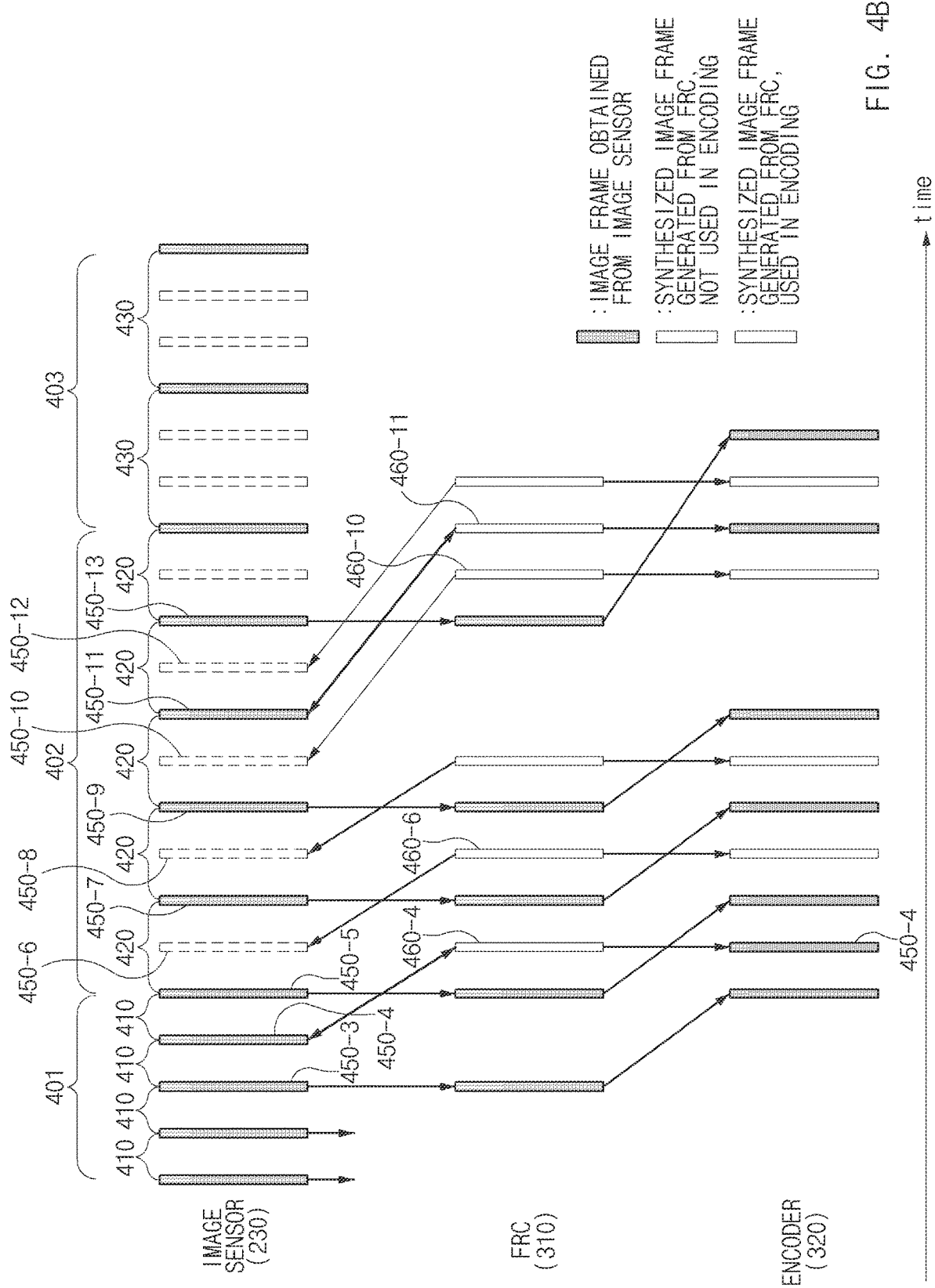
FIG. 4B illustrates an operation of an electronic device on a time domain, which is to reduce a frame rate of an image sensor, according to an embodiment of the disclosure.
Figure 4C:
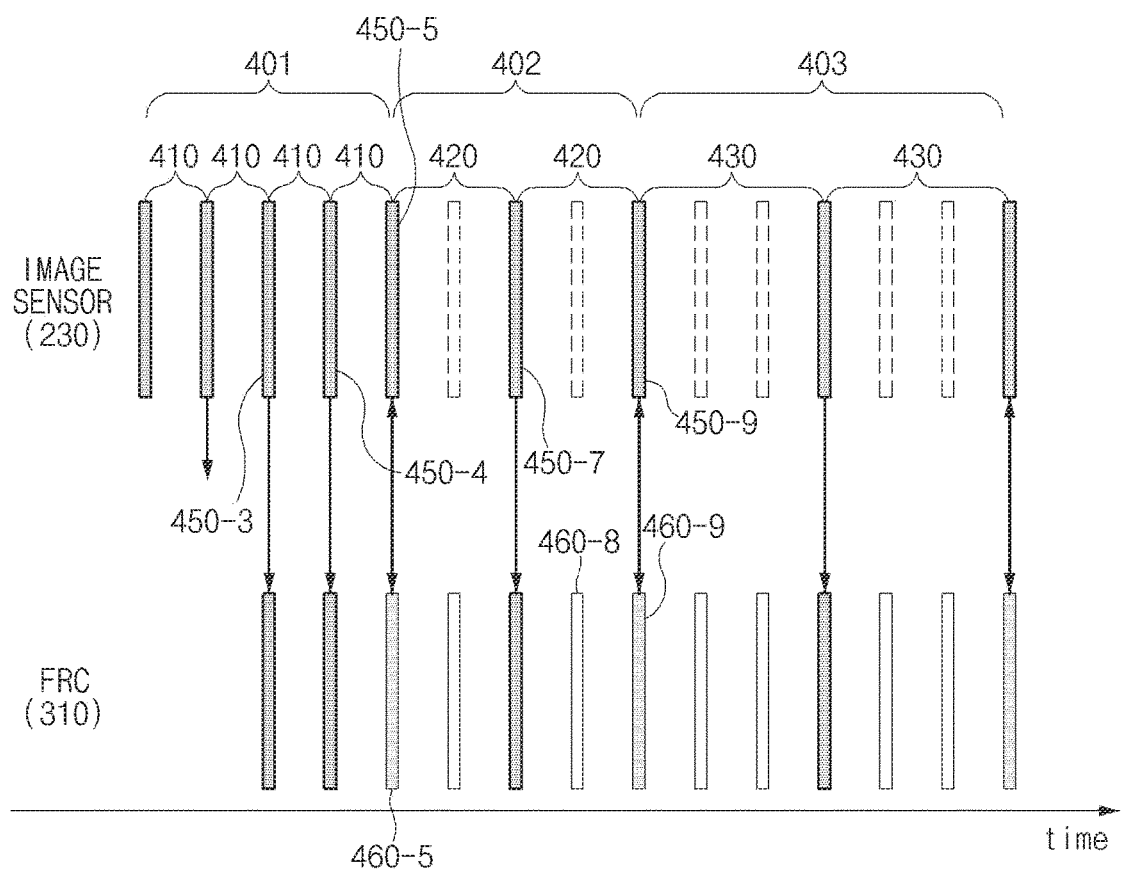
FIG. 4C illustrates another operation of an electronic device on a time domain, which is to reduce a frame rate of an image sensor, according to an embodiment of the disclosure.

FIGS. 4B and 4C illustrate the operation of the electronic device on a time domain, which is to reduce the frame rate of the image sensor, according to various embodiments of the disclosure.

Referring to FIG. 4B, the electronic device 101 may generate the synthesized image frame (e.g., 460-4) corresponding to the $N^{th}$ image frame (e.g., 450-4) based on the $(N-1)^{th}$ image frame (e.g., 450-3) and the $(N+1)^{th}$ image frame (e.g., 450-5). The electronic device 101 may generate the synthesized image frame (e.g., 460-4) after the $(N+1)^{th}$ image frame (or substantially simultaneously with generating the $(N+1)^{th}$ image frame), because the $(N+1)^{th}$ image frame (e.g., 450-5) is necessary to generate the synthesized image frame (e.g., 460-4). The electronic device 101 may identify the similarity between the Nth image frame (e.g., 450-4) and the synthesized image frame (e.g., 460-4). According to an embodiment, the synthesized image frame (e.g., 460-4) corresponding to the $N^{th}$ image frame may be generated before an $(N+2)^{th}$ image frame (e.g., 450-6) or substantially simultaneously with generating the $(N+2)^{th}$ image frame (e.g., 450-6). The electronic device 101 may encode the $N^{th}$ image frame (e.g., 450-4) because the $N^{th}$ image frame (e.g., 450-4) is present, even if the electronic device 101 generates the synthesized image frame (e.g., 460-4). According to another embodiment, the electronic device 101 may encode the $N^{th}$ image frame (e.g., 460-4) to reduce the operating time of the frame rate converter 310 and the encoder 320.

Similarly, the electronic device 101 may generate a synthesized image frame (e.g., 460-6) after (or substantially simultaneously with that) an $(M+1)^{th}$ image frame (e.g., 450-7) is generated, to generate the synthesized image frame (e.g., 460-6) corresponding to the $M^{th}$ image frame (e.g., 450-6).

According to an embodiment, the electronic device 101 may generate a synthesized image frame (e.g., 460-10) corresponding to a $P^{th}$ image frame (e.g., 450-10) by using a $(P-1)^{th}$ image frame (e.g., 450-9) and a $(P+1)^{th}$ image frame (e.g., 450-11), or by using the $(P-1)^{th}$ image frame (e.g., 450-9) and a $(P+3)^{th}$ image frame (e.g., 450-13) in consideration of changing the frame rate of the image sensor 230. The electronic device 101 may generate the (P+1)$^{th}$ synthesized image frame (e.g., 460-11) or a (P+2)$^{th}$ synthesized image frame (e.g., 460-12), as well as the P$^{th}$ synthesized image frame (e.g., 460-10) by using the (P−1)$^{th}$ image frame (e.g., 450-9) and the (P+3)$^{th}$ image frame (e.g., 450-13). The electronic device 101 may control the frame rate by identifying the similarity between the (P+1)$^{th}$ image frame (e.g., 450-11) and the (P+1)$^{th}$ synthesized image frame (e.g., 460-11).

As described above, as the frame rate of the image sensor 230 decreases (or a specified time interval increases), a time required to generate a synthesized image frame may increase. Therefore, according to an embodiment, the electronic device 101 may control the frame rate of the image sensor 230 without considering the (N+1)$^{th}$ image frame. For example, referring to FIG. 4C, the electronic device 101 may generate the N$^{th}$ synthesized image frame (e.g., 460-5) based on at least one of the (N−2)$^{th}$ image frame (e.g., 450-3) or the (N−1)$^{th}$ image frame (e.g., 450-4). The electronic device 101 may control the frame rate by identifying the similarity between the N$^{th}$ image frame (e.g., 450-5) and the N$^{th}$ synthesized image frame (e.g., 460-5). According to an embodiment, the N$^{th}$ synthesized image frame (e.g., 460-5) may be generated before (substantially simultaneously with) the N$^{th}$ image frame (e.g., 450-5). Even if the electronic device 101 generates the N$^{th}$ synthesized image frame (e.g., 460-5), the electronic device 101 may encode the N$^{th}$ image frame (e.g., 450-5) because the N$^{th}$ image frame (e.g., 450-5) is present. According to another embodiment, the electronic device 101 may encode the N$^{th}$ image frame (e.g., 450-5) to reduce the operating time of the frame rate converter 310 and the encoder 320.

Similarly, the electronic device 101 may generate an (M+1)$^{th}$ synthesized image frame (e.g., 460-8) or an (M+2)$^{th}$ synthesized image frame (e.g., 460-9), after the M$^{th}$ image frame (e.g., 450-7).

Figure 5:
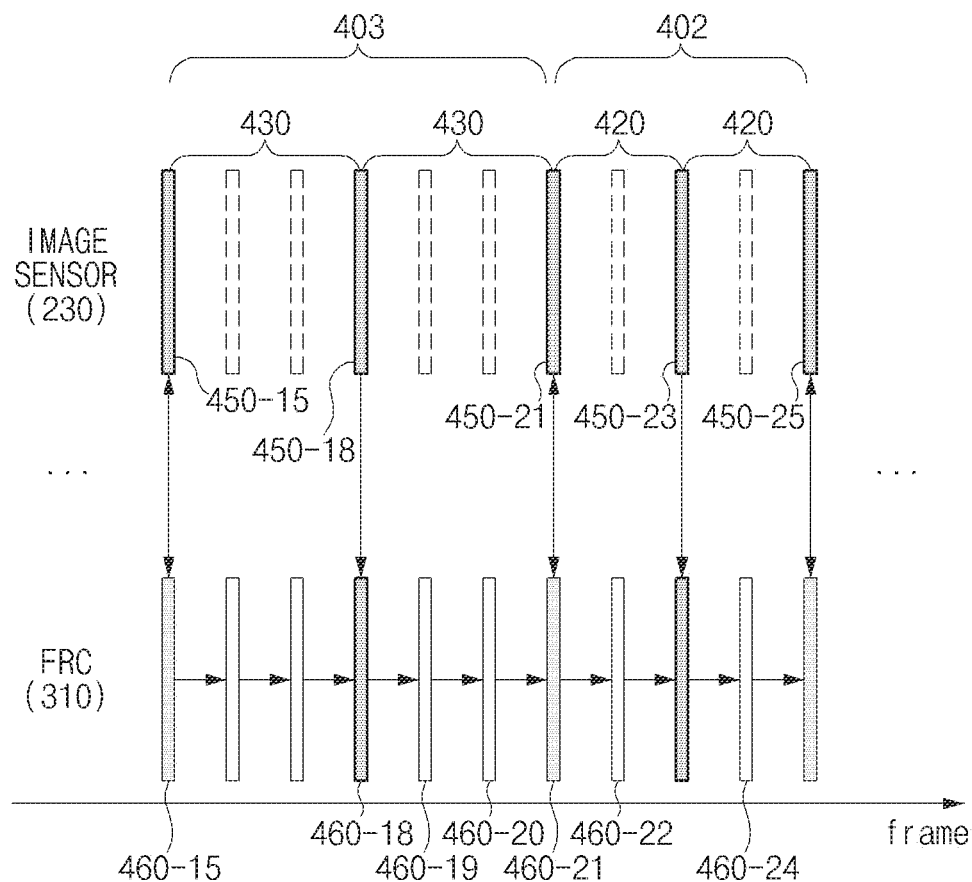
FIG. 5 illustrates an operation of an electronic device to increase a frame rate of an image sensor, according to an embodiment of the disclosure.
Figure 5:
Figure 5:
Figure 5:

FIG. 5 illustrates the operation of the electronic device 101 to increase the frame rate of the image sensor 230, according to an embodiment of the disclosure. The operations illustrated in FIG. 5 may be performed at any position of an input image, similarly to the operations illustrated in FIG. 4A (or FIG. 4B).

Referring to FIG. 5, after the frame rate of the image sensor 230 is changed to the third frame rate 403, the electronic device 101 may generate a synthesized image frame (e.g., 460-21) corresponding to an L$^{th}$ image frame (e.g., 450-21) (L is a natural number greater than K) obtained from the image sensor 230. When the similarity between the L$^{th}$ image frame and the synthesized image frame corresponding to the L$^{th}$ image frame is less than a specified threshold value, the electronic device 101 may change the frame rate of the image sensor 230 to the second frame rate 402 greater than the third frame rate 403. In this case, the electronic device 101 may sequentially obtain image frames (e.g., 450-23 or 450-25) through the image sensor 230 at the second specified time interval 420 shorter than the third specified time interval 430. According to an embodiment, the electronic device 101 may decrease the frame rate of the frame rate converter 310 corresponding to that the frame rate of the image sensor 230 increases.

Figure 6:
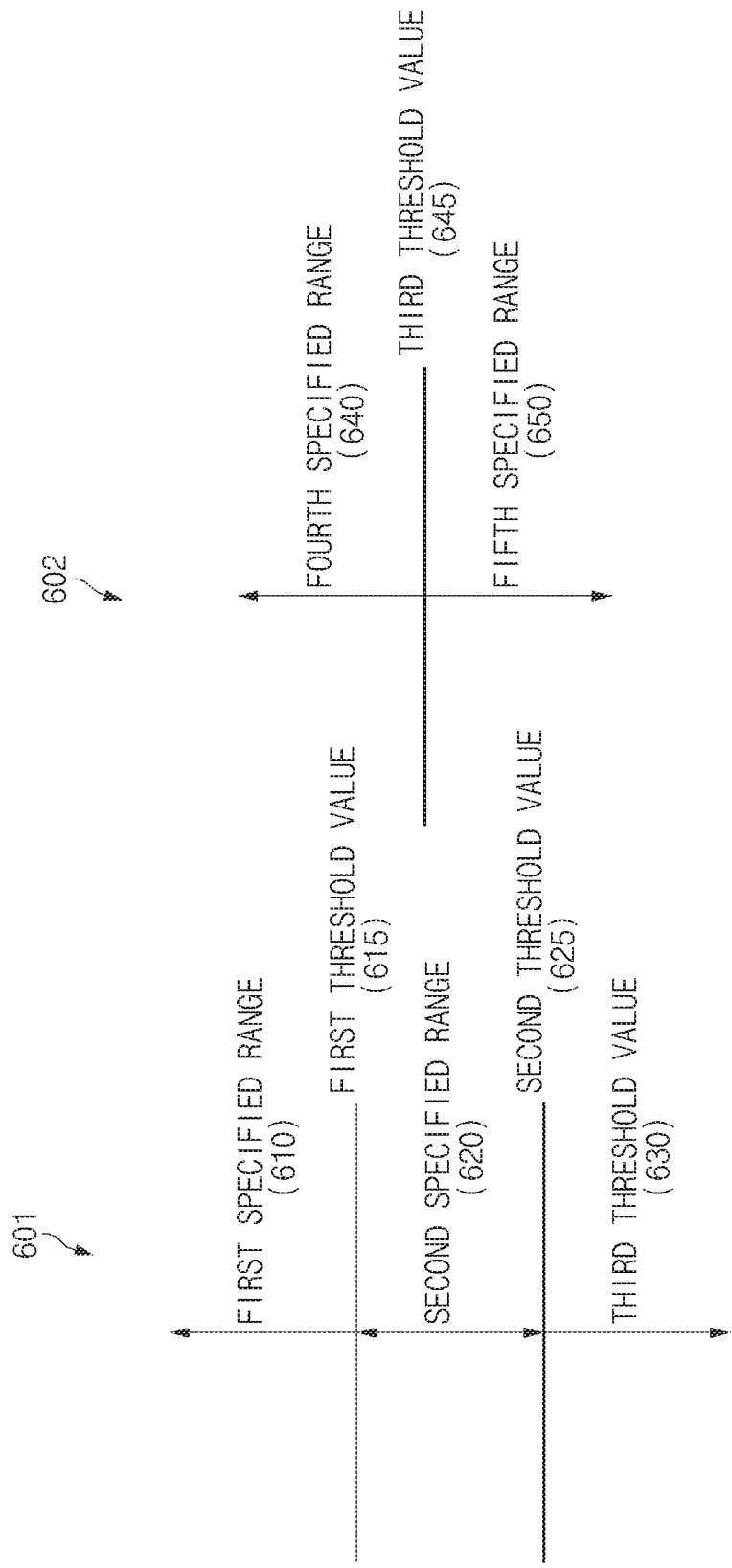
FIG. 6 illustrates an operation of an electronic device to control a frame rate based on at least one threshold value, according to an embodiment of the disclosure.

FIG. 6 illustrates the operation of the electronic device 101 to control a frame rate based on at least one threshold value, according to an embodiment of the disclosure.

Referring to FIG. 6, the electronic device 101 may set at least one threshold value to control the frame rate of the image sensor 230. For example, the electronic device 101 may set a plurality of threshold values (e.g., 615 or 625) as illustrated in operation 601, or may set a single threshold value (e.g., 645) as illustrated in operation 602. According to an embodiment, the threshold value may be set at least one of the image quality of the moving picture, motion sensor information, the motion degree of a subject, a current consumed in the image sensor 230 and the image signal processor 260, the frame rate of the image sensor 230 which is moving, or a user setting.

In operation 601, the electronic device 101 may determine (identify) whether the similarity between the N$^{th}$ image frame and the synthesized image frame corresponding to the N$^{th}$ image frame is equal to or greater than the first threshold value 615 (e.g., whether the similarity is in a first specified range 610), whether the similarity is less than the first threshold 615 and equal to or greater than the second threshold value 625 (e.g., whether the similarity is in the second specified range 620), or whether the similarity is less than the second threshold value 625 (e.g., whether the similarity is in the third specified range 630). According to one embodiment, the similarity may refer to a correlation between two images. As the similarity is increased, the resultant value of the similarity may be increased. For example, when the similarity is expressed as the differential value between image frames, it may be determined that a less value represents a higher similarity. When the similarity is present in the first specified range 610, the electronic device 101 may decrease the frame rate of the image sensor 230 and may increase the frame rate of the frame rate converter 310. When the similarity is present in the second specified range 620, the electronic device 101 may maintain the frame rates of the image sensor 230 and the frame rate converter 310. When the similarity is present in the third specified range 630, the electronic device 101 may increase the frame rate of the image sensor 230 and may decrease the frame rate of the frame rate converter 310.

In operation 602, the electronic device 101 may determine (identify) whether the similarity between the N$^{th}$ image frame and the synthesized image frame corresponding to the N$^{th}$ image frame is equal to or greater than the third threshold value 645 (e.g., whether the similarity is in a fourth specified range 640) or less than the third threshold value 645 (whether the similarity is in a fifth specified range 650). When the similarity is present in the fourth specified range 640, the electronic device 101 may decrease the frame rate of the image sensor 230 and may increase the frame rate of the frame rate converter 310. When the similarity is present in the fifth specified range 650, the electronic device 101 may increase the frame rate of the image sensor 230 and may decrease the frame rate of the frame rate converter 310.

Figure 7:
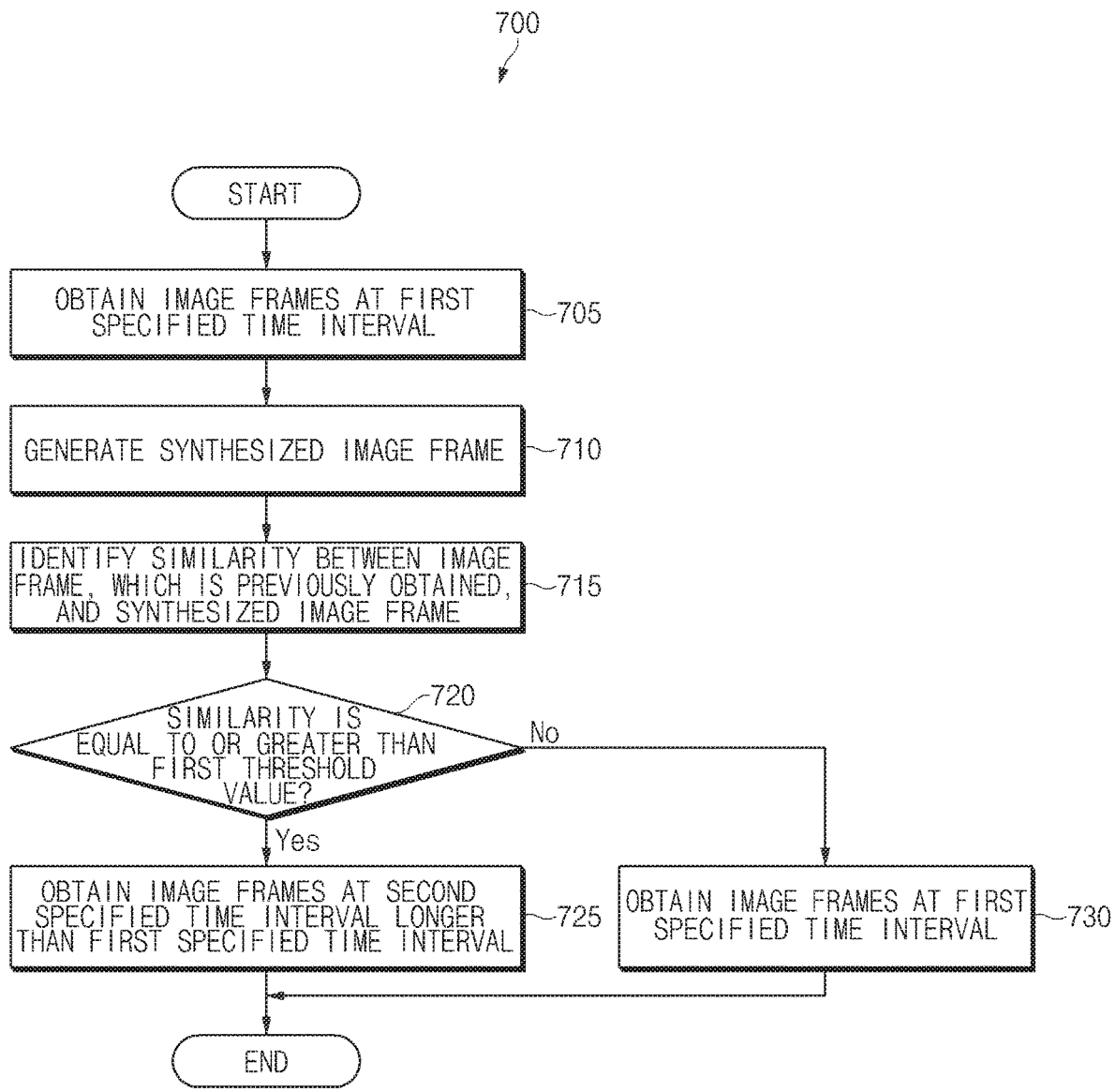
FIG. 7 illustrates a flowchart of an operations of an electronic device to increase or maintain a frame rate of an image sensor based on a threshold value, according to an embodiment of the disclosure.

FIG. 7 illustrates a flowchart 700 of the electronic device 101 to reduce or maintain the frame rate of the image sensor 230 based on the threshold value according to an embodiment of the disclosure. Hereinafter, the flowchart of the operations illustrated in FIG. 7 and another drawing may be performed by the electronic device 101 or by at least one component included in the electronic device 101.

Referring to FIG. 7, in operation 705 of the flowchart 700, the electronic device 101 may obtain a plurality of image frames (e.g., 450-1, 450-2, 450-3, 450-4, and 450-5 of FIG. 4A) at a first specified time interval (e.g., 410 of FIG. 4A) through the image sensor 230.

In operation 710, the electronic device 101 may generate a synthesized image frame (e.g., 460-4 of FIG. 4A) corresponding an N$^{th}$ image frame (e.g., 450-4 of FIG. 4A) through the frame rate converter 310. According to an embodiment, the electronic device 101 may generate a synthesized image frame based on an (N−1)$^{th}$ image frame (e.g., 450-3 of FIG. 4A) and an (N+1)$^{th}$ image frame (e.g., 450-5 of FIG. 4A).

The electronic device 101 may identify the similarity between the N$^{th}$ image frame and the synthesized image frame in operation 715, and may determine whether the similarity is equal to or greater than the first threshold value (e.g., 615 of FIG. 6) in operation 720. When the similarity is equal to or greater than the first threshold value, the electronic device 101 may perform operation 725. When the similarity is less than the first threshold value, the electronic device 101 may perform operation 730.

According to an embodiment, the electronic device 101 may perform operation 710 to operation 720 in a specified period. The specified period may be determined based at least one of, for example, the image quality of a moving picture, an image signal, a current consumed in the image signal processor 260, or a user setting. According to an embodiment, the specified period may be varied depending on the similarity. For example, the electronic device 101 may increase the specified period when the similarity is equal to or greater than the first threshold value, and may decrease the specified period when the similarity is less than the first threshold value.

In operation 725, the electronic device 101 may obtain images frames (e.g., 450-7 and 450-9 of FIG. 4A) at a second specified time interval (e.g., 420 of FIG. 4A) longer than a first specified time interval. According to an embodiment, the electronic device 101 may set the maximum value of the exposure time, and may control the exposure time not to become equal to or greater than the maximum value as the frame rate of the image sensor 230 is reduced. According to an embodiment, the electronic device 101 may perform additional image processing to reduce the difference in brightness or clearness between image frames obtained at the first specified time interval and image frames obtained at the second specified time interval.

In operation 730, the electronic device 101 may obtain image frames at the first specified time interval.

Figure 8:
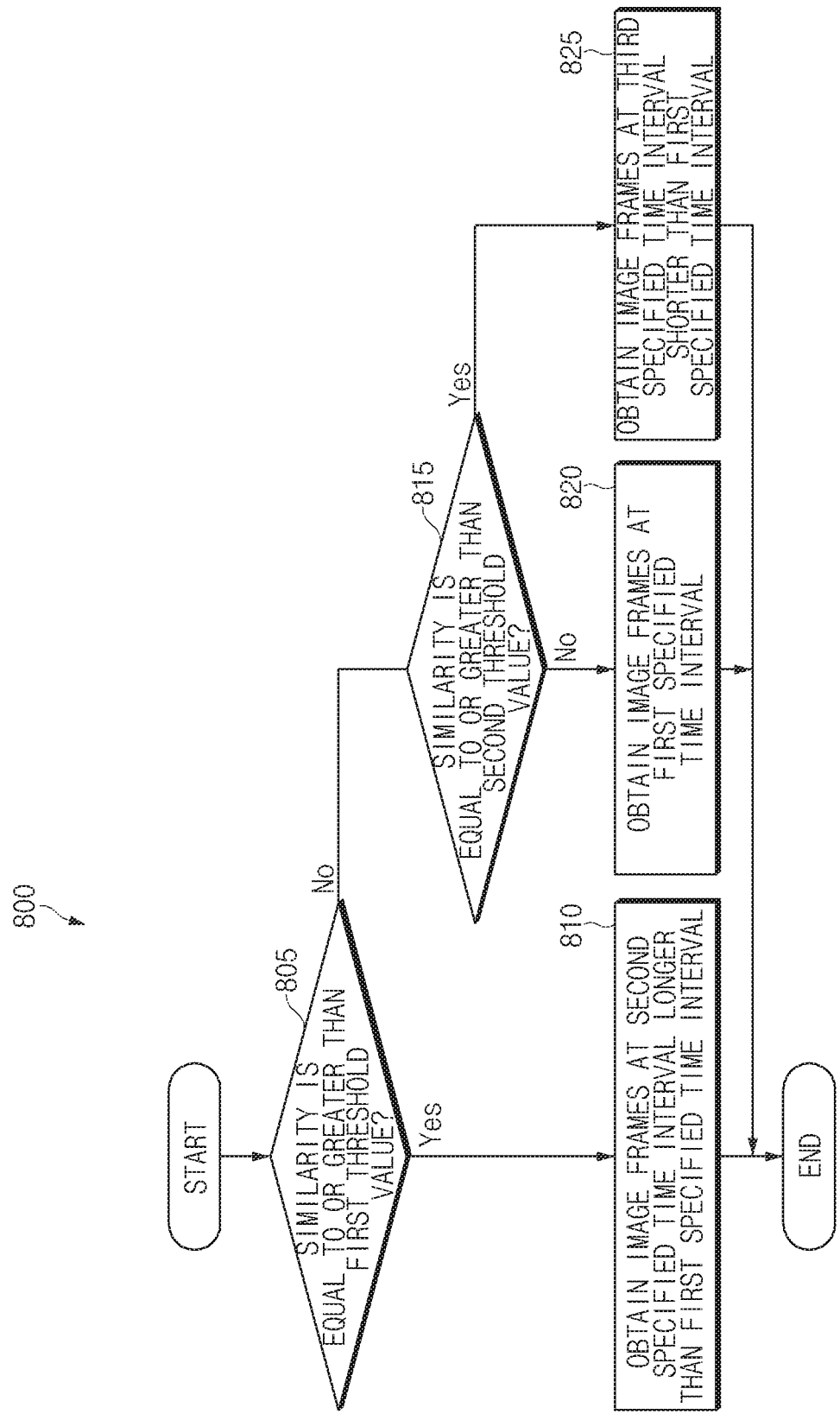
FIG. 8 illustrates a flowchart of an operation of an electronic device to control a frame rate of an image sensor, based on a plurality of threshold values, according to an embodiment of the disclosure.

FIG. 8 illustrates a flowchart 800 of the electronic device 101 to control the frame rate of the image sensor 230 based on a plurality of threshold values according to an embodiment of the disclosure.

Referring to FIG. 8, in operation 805 of the flowchart 800 of the operations, the electronic device 101 may determine whether the similarity is equal to or greater than a first threshold value (e.g., operation 720 of FIG. 2). When the similarity is equal to or greater than the first threshold value, the electronic device 101 may obtain image frames at the second specified time interval longer than the first specified time interval in operation 810 (e.g., operation 725 of FIG. 7). When the similarity is less than the first threshold value, the electronic device 101 may perform operation 815.

In operation 815, the electronic device 101 may determine whether the similarity is less than the second threshold value (e.g., the second threshold value 625 of FIG. 6). When the similarity is not less than a second threshold value, the electronic device 101 may obtain image frames at the first specified time interval in operation 820. When the similarity is less than the second threshold value, the electronic device 101 may obtain image frames at a third specified time interval shorter than the first specified time interval in operation 825.

Figure 9:
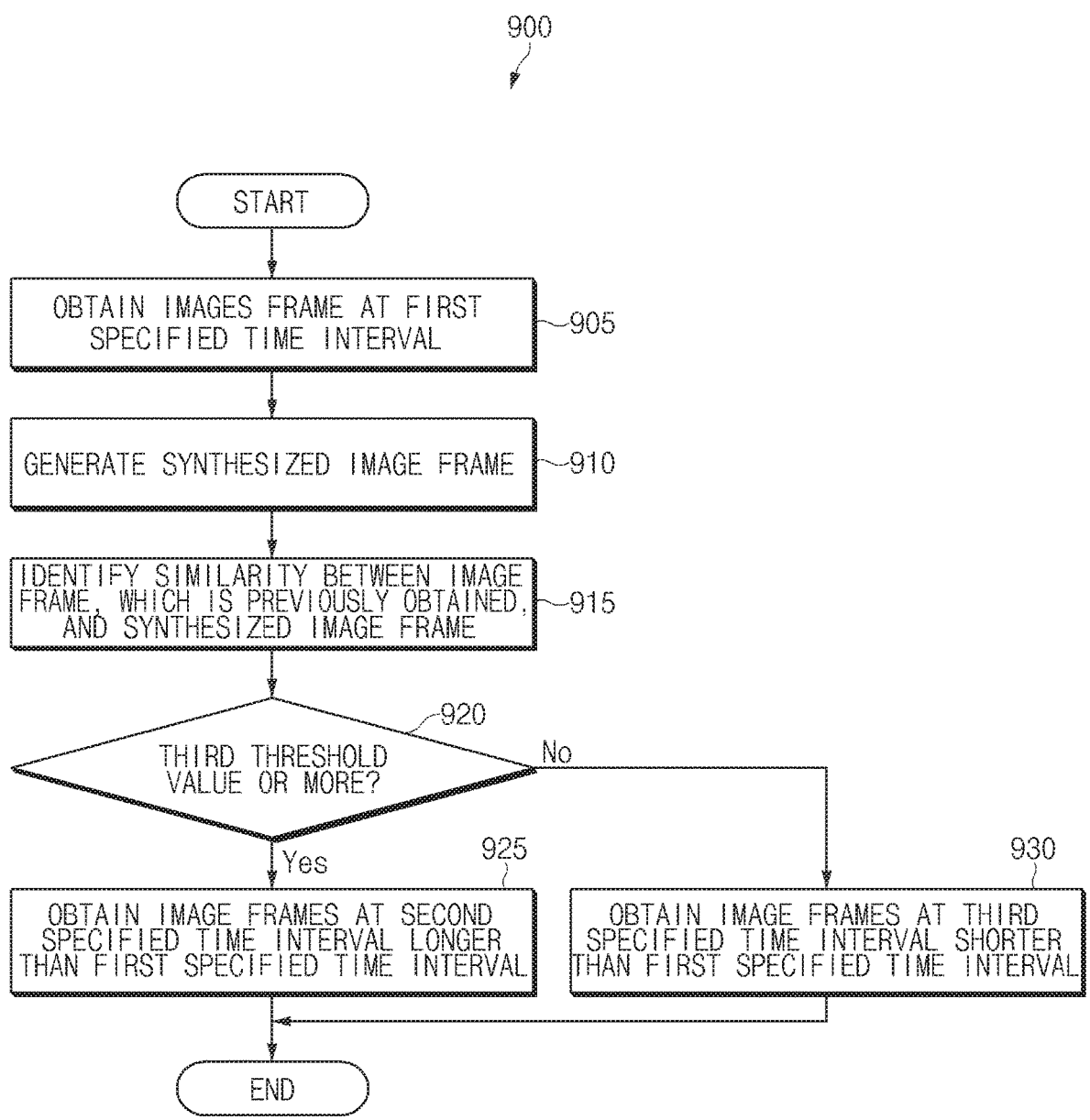
FIG. 9 illustrates a flowchart of an operation of an electronic device to increase or reduce the frame rate of an image sensor based on a threshold value, according to an embodiment of the disclosure.

FIG. 9 illustrates a flowchart 900 of the electronic device 101 to increase or reduce the frame rate of the image sensor 230 based on the threshold value, according to an embodiment of the disclosure.

Referring to FIG. 9, the electronic device 101 may obtain a plurality of images frame at the first specified time interval through the image sensor 230 in operation 905 of the flowchart 900. In operation 910, the electronic device 101 may generate a synthesized image frame corresponding to an N$^{th}$ image frame, through the frame rate converter 310. The electronic device 101 may identify the similarity between the N$^{th}$ image frame and the synthesized image frame in operation 915, and may determine whether the similarity is equal to or greater than a third threshold value (e.g., 645 of FIG. 6) in operation 920. When the similarity is equal to or greater than the third threshold value, the electronic device 101 may perform operation 925. When the similarity is less than the third threshold value, the electronic device 101 may perform an operation 930.

According to an embodiment, the electronic device 101 may perform operation 710 to 720 in a specified period. The specified period may be determined based at least one of, for example, the image quality of a moving picture, an image signal, a current consumed in the image signal processor 260, or a user setting. According to an embodiment, the specified period may be varied depending on the similarity. For example, the electronic device 101 may decrease the specified period when the similarity is equal to or greater than the third threshold value, and may decrease the specified period when the similarity is less than the third threshold value.

In operation 925, the electronic device 101 may obtain image frames at the second specified time interval longer than the first specified time interval. According to an embodiment, the electronic device 101 may perform additional image processing to reduce the difference in brightness or clearness between image frames obtained at the first specified time interval and image frames obtained at the second specified time interval.

In operation 930, the electronic device 101 may obtain image frames at the third specified time interval shorter than the first specified time interval.

Figure 10:
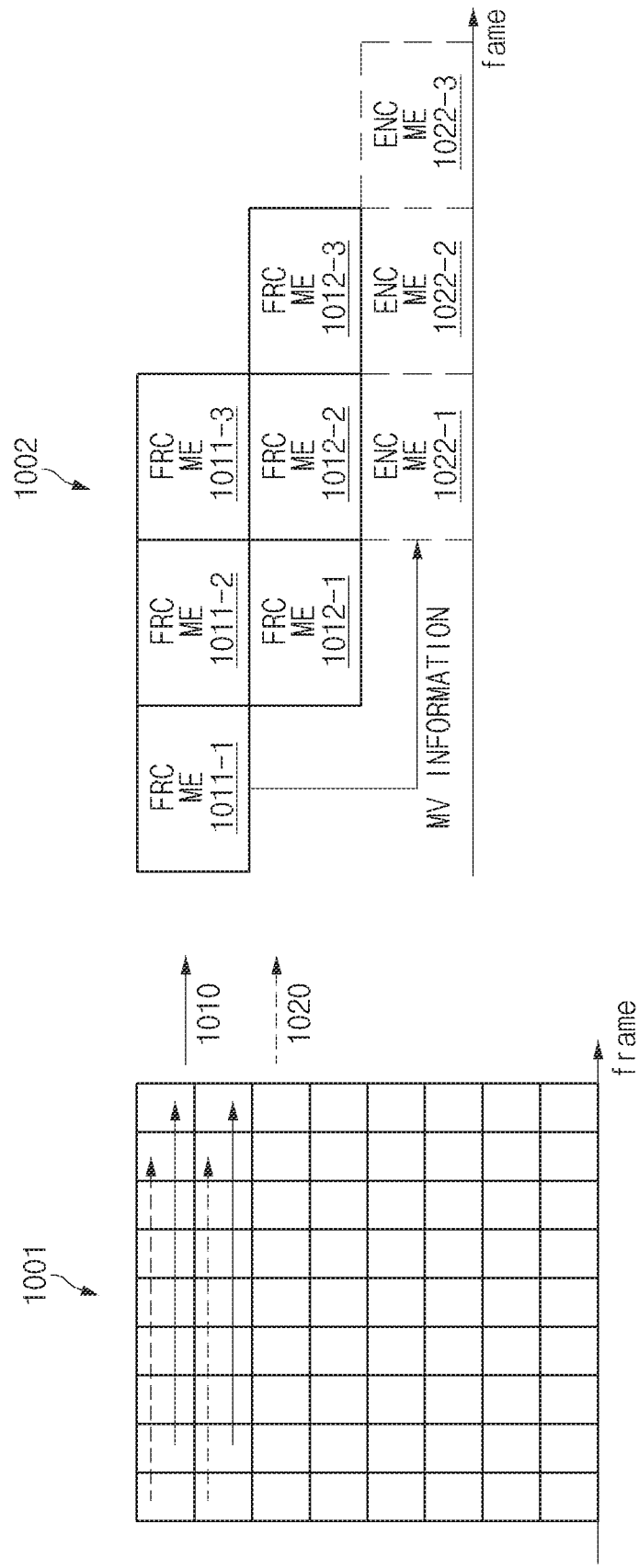
FIG. 10 illustrates an operation in which an encoder uses information on a motion vector obtained by a frame rate converter, according to an embodiment of the disclosure.

FIG. 10 illustrates an operation in which the encoder 320 uses motion vector information obtained by the frame rate converter 310, according to an embodiment of the disclosure.

According to an embodiment, the frame rate converter 310 may be disposed in a front stage of the encoder 320 or may be included in the encoder 320. When the frame rate converter 310 is included inside the encoder 320, the frame rate converter 310 may share some modules together with the encoder 320. Some modules may include at least one of a motion estimation module or a motion compensation module.

In graph 1001 of FIG. 10, a horizontal axis represents image frames sequentially processed over time. The frame rate converter 310 is included in the encoder 320. Accordingly, image processing operation 1010 (e.g., frame rate conversion) of the frame rate converter 310 and image processing operation 1020 (e.g., encoding) of the encoder 320 may be performed in parallel to each other or substantially simultaneously with each other. When the image processing operation 1010 of the frame rate converter 310 and the image processing operation 1020 of the encoder 320 are performed in parallel, time for image processing and power consumption may be reduced.

According to an embodiment, the electronic device 101 may perform encoding through the encoder 320, based on motion vector information obtained by the frame rate converter 310. For example, the frame rate converter 310 may transmit motion vector information, which is obtained by estimating (e.g., 1011-1) a motion for the N$^{th}$ image frame, to the encoder 320. The encoder 320 may estimate (e.g., 1022-1) a motion for the N$^{th}$ image frame using the received motion vector information, thereby reducing power consumption and the time for image processing.

Figure 11:
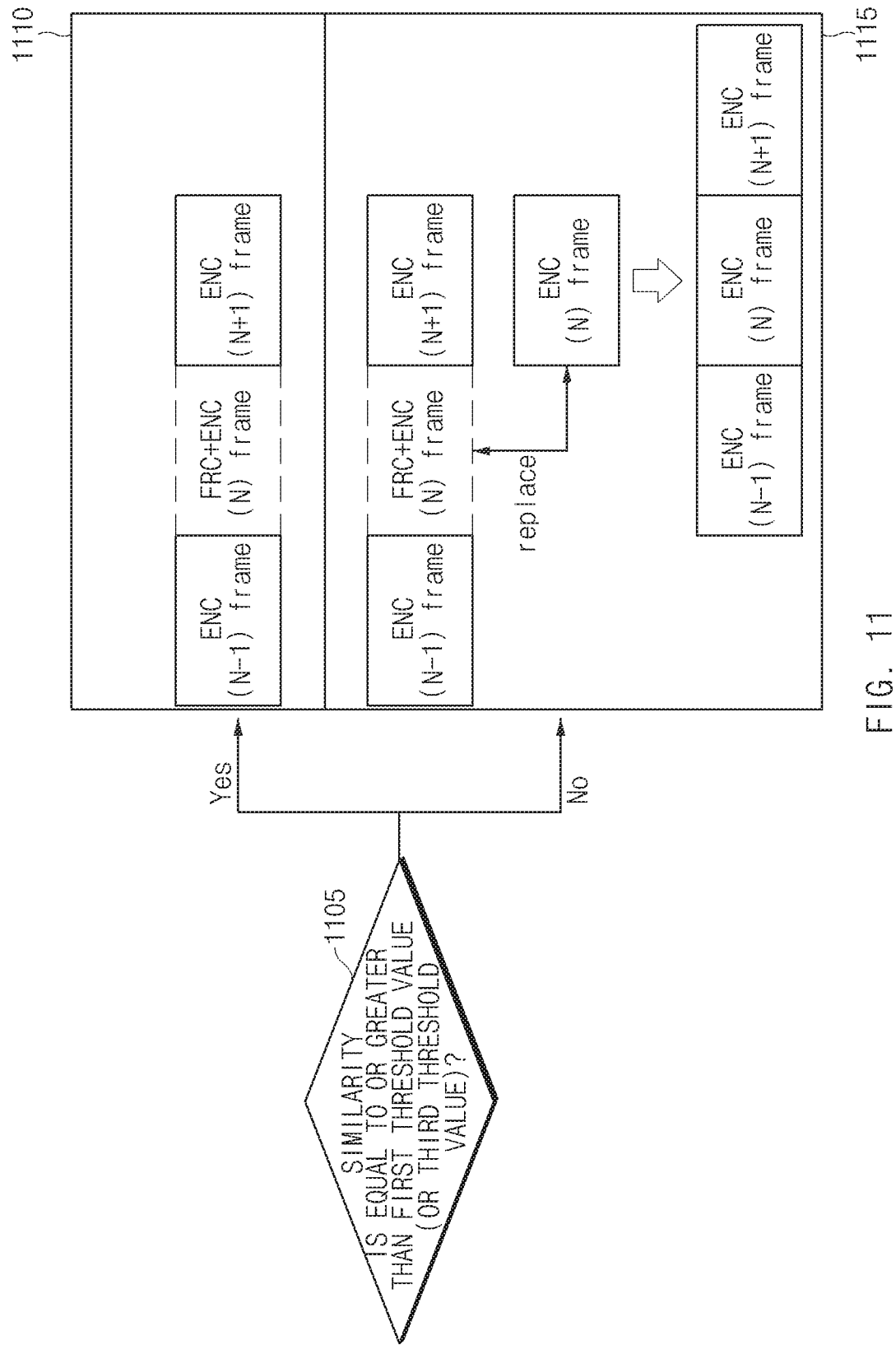
FIG. 11 illustrates an operation to generate a moving picture by using a synthesized image frame, according to an embodiment of the disclosure.

FIG. 11 illustrates an operation of generating a moving picture using a synthesized image frame, according to an embodiment of the disclosure.

Referring to FIG. 11, the electronic device 101 may generate image frames in a bit stream. According to an embodiment, when the image processing operation (e.g., 1010 of FIG. 10) of the frame rate converter 310 and the image processing operation (e.g., 1020 of FIG. 10) of the encoder 320 are performed in parallel to each other, the electronic device 101 may generate the image frames (e.g., 450-3, 450-4, and 450-5 of FIG. 4A) in a bit stream and may identify the similarity between the N$^{th}$ image frame (e.g., 450-4 of FIG. 4A) and a synthesized image frame (e.g., 460-4 of FIG. 4A) corresponding to the N$^{th}$ image frame.

In operation 1105, the electronic device 101 may determine whether the similarity is equal to or greater than the first threshold value (e.g., 615 of FIG. 6) or the third threshold value (e.g., 645 of FIG. 6).

When the similarity is greater than or equal to the first threshold value or the third threshold value, the electronic device 101 may not change the generated bit stream in operation 1110. In this case, the N$^{th}$ image frame included in the bit stream may be a synthesized image frame by the frame rate converter 310.

When the similarity is less than or equal to the first threshold value or the third threshold value, the electronic device 101 may change a portion of the bit stream in operation 1115. For example, the electronic device 101 may substitute the N$^{th}$ image frame in the bit stream with the N$^{th}$ image frame encoded by the encoder 320. According to an embodiment, the electronic device 101 may use a function (e.g., a tile function or multiple slice function) of dividing a partial region of the image frame. For example, the electronic device 101 may identify the similarity for each region forming an image frame, may use an encoding result value without change, with respect to a region having a higher similarity, and may re-perform encoding with respect to a region having a lower similarity. In this case, the electronic device 101 may generate a bit stream by combining the encoding result value without change and an encoding value obtained as the encoding is re-performed.

Figure 12:
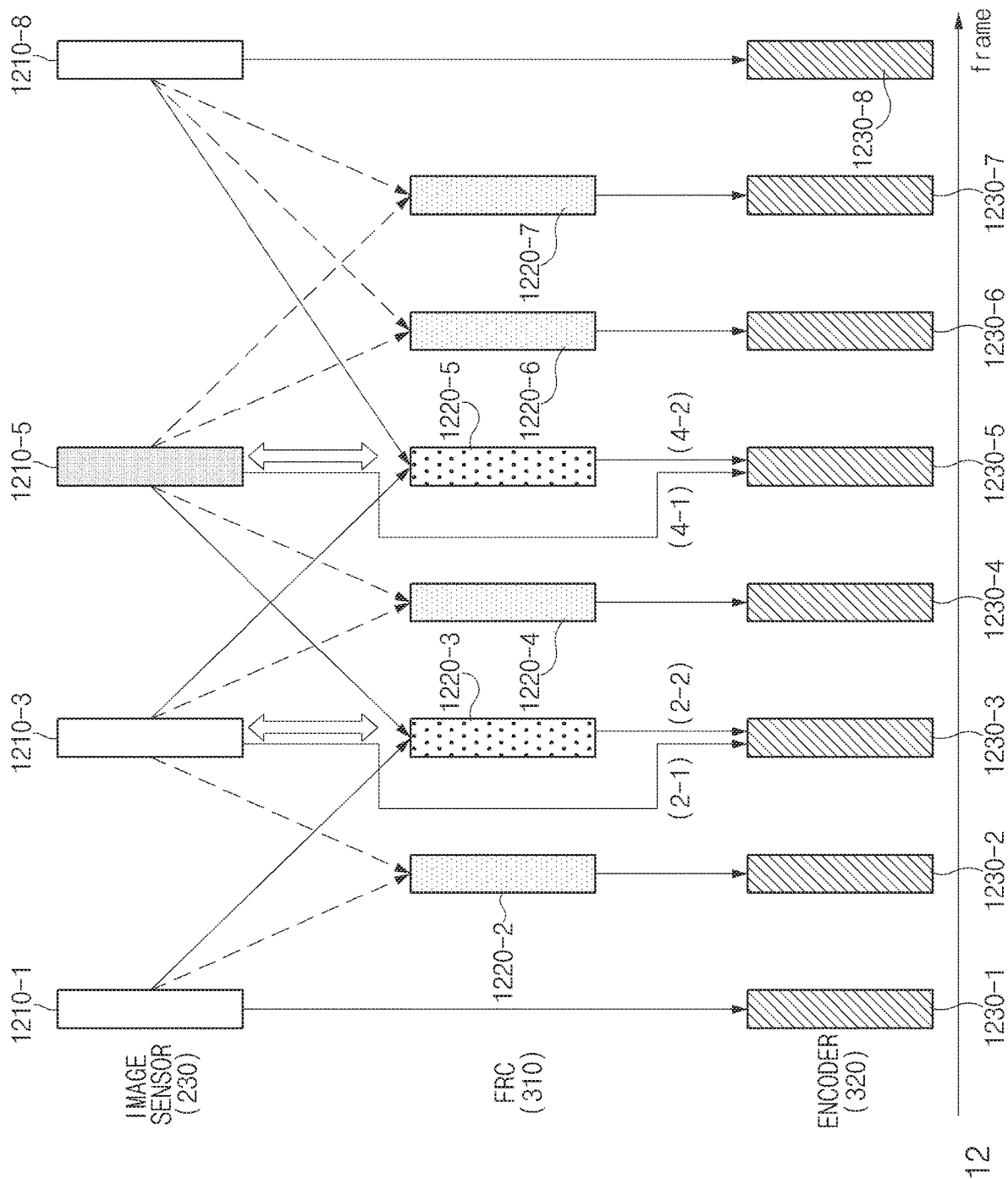
FIG. 12 illustrates another operation to generate a moving picture by using a synthesized image frame, according to an embodiment of the disclosure.

FIG. 12 illustrates another operation to generate a moving picture by using a synthesized image frame, according to an embodiment of the disclosure. FIG. 12 illustrates an example in which image frames generated by the frame rate converter 310 and the encoder 320 are aligned in the sequence of image frames obtained by the image sensor 230.

Referring to FIG. 12, the electronic device 101 may generate a moving picture based on image frames (e.g., 1230-1, 1230-2, 1230-3, 1230-4, 1230-5, 1230-6, 1230-7, and 1230-8) sequentially generated by the encoder 320. The image frames (e.g., 1230-1, 1230-2, 1230-3, 1230-4, 1230-5, 1230-6, 1230-7, and 1230-8) may be based on image frames (e.g., 1210-1, 1210-3, 1210-5, and 1210-8) obtained by the image sensor 230 or synthesized image frames (e.g., 1220-2, 1220-3, 1220-4, 1220-5, 1220-6, and 1220-7) generated by the frame rate converter 310. According to an embodiment, the electronic device 101 may generate a synthesized image frame (e.g., 1220-3) corresponding to an N$^{th}$ image frame (e.g., 1210-3) obtained from the image sensor and may control the frame rate of the image sensor 230 based on the similarity between the N$^{th}$ image frame (e.g., 1210-3) and the synthesized image frame (e.g., 1220-3).

According to an embodiment, the electronic device 101 may use at least one of the image frame 1210-3 obtained from the image sensor 230 or the synthesized image frame (e.g., 1220-3) generated by the frame rate converter 310, to generate the N$^{th}$ image frame (e.g., 1230-3) using the encoder 320. For example, when the similarity is equal to or greater than the threshold value (e.g., the first threshold value 615 or the third threshold value 645 of FIG. 6), the electronic device 101 may use the synthesized image frame (e.g., 1220-3). For another example, when the similarity is less than the threshold value, the electronic device 101 may use the image frame (e.g., 1210-3) obtained from the image sensor. For another example, when the similarity is equal to or greater than the threshold value in the entire portion of an image frame, but the similarity is less than the threshold value in a portion of the image frame, the electronic device 101 may substitute the portion having a lower similarity with the image frame (e.g., 1210-3) obtained by the image sensor 230 or use a portion of the image frame generated through the tile function or the multiple slice function of the encoder 320.

According to an embodiment, the electronic device 101 may identify the similarity several times to control the frame rate of the image sensor 230. For example, the electronic device 101 may enhance the accuracy by controlling the frame rate of the image sensor 230 based on not only the similarity between the N$^{th}$ image frame (e.g., 1210-3) and the synthesized image frame (e.g., 1220-3) corresponding to the N$^{th}$ image frame, but also the similarity between an M$^{th}$ image frame (e.g., 1210-5) and a synthesized image frame (e.g., 1220-5) corresponding to the M$^{th}$ image frame (e.g., 1210-5).

According to an embodiment, the electronic device 101 may control the frame rate of the image sensor 230, based on at least one of the brightness of the image frame obtained from the image sensor 230, motion information (e.g., motion vector), image quality, a residual battery level, or illuminance measured by an illuminance sensor without identifying the similarity. For example, the electronic device 101 may reduce the frame rate of the image sensor 230 when the brightness of the image frame obtained by the image sensor 230 is dark or the illuminance of the image frame is low, or may increase the frame rate of the image sensor 230 when it is determined that the motion in the image is great based on the motion information. According to an embodiment, the electronic device 101 may determine (or identify) the brightness of the image frame by using the histogram information of the image frame or the illuminance sensor (e.g., at least a portion of the sensor module 176 of FIG. 1). According to an embodiment, the electronic device 101 may obtain motion information using the motion sensor (e.g., a gyroscope or a gravity sensor).

Figure 13:
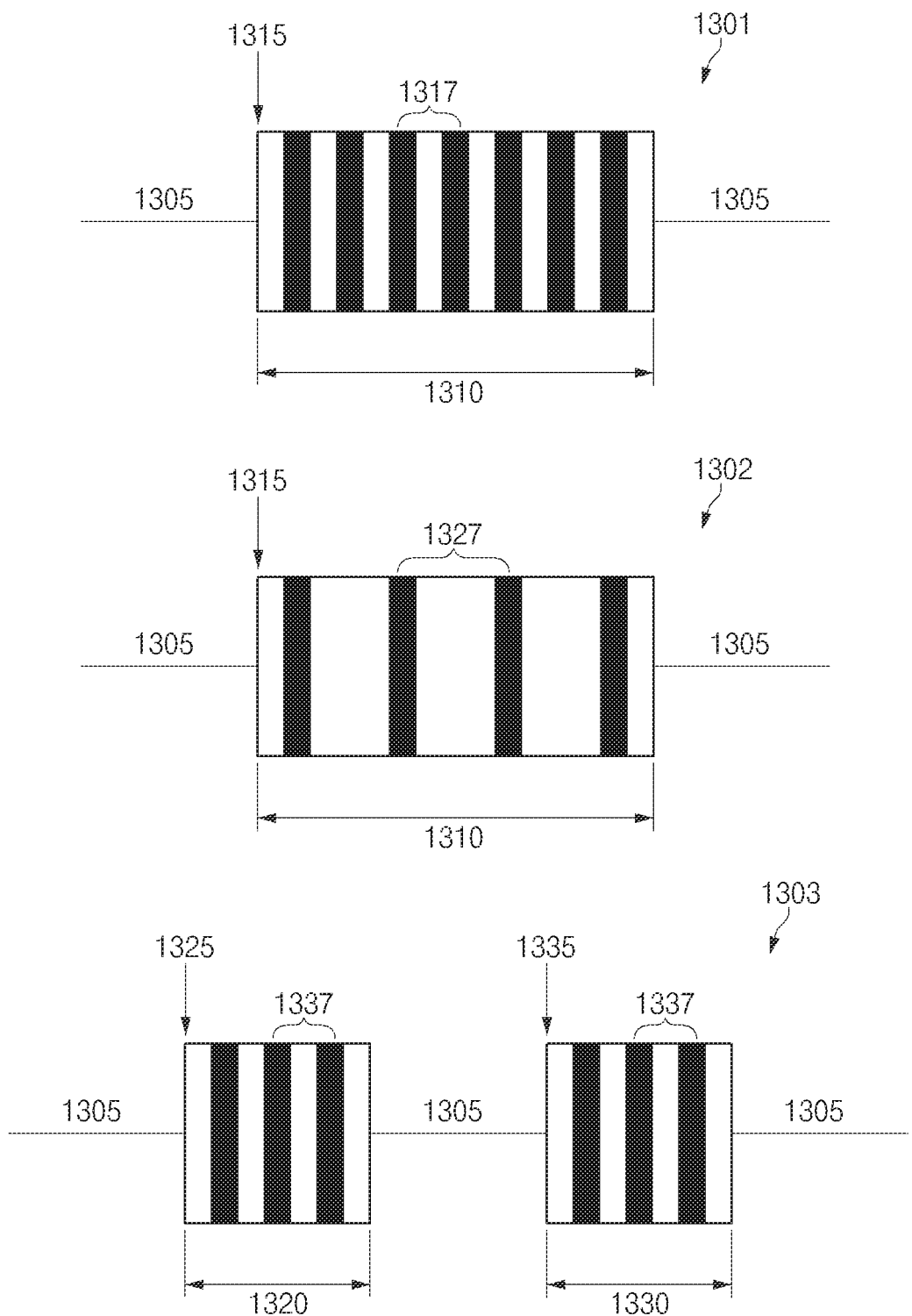
FIG. 13 is a view illustrating an operation of an electronic device to determine a frame rate, according to an embodiment of the disclosure.

FIG. 13 illustrates the operation of the electronic device 101 to determine the frame rate (e.g., the first frame rate 401 of FIG. 4A), according to an embodiment of the disclosure.

Referring to FIG. 13, in operation 1301 to operation 1303, the horizontal axis may represent the duration (e.g., time duration) in which a moving picture is photographed by the electronic device 101. According to one embodiment, the electronic device 101 may apply slow motion (or which is referred to as super slow motion) for least some durations (e.g., 1310, 1320, or 1330) of durations, in which a moving picture is photographed. The subject, which is photographed for the duration that the slow motion is applied, is slowly reproduced on the display (e.g., the display device 160 of FIG. 1). Accordingly, the electronic device 101 may control the frame rate such that the frame rate of the image sensor 230 for the duration that the slow motion is applied is higher than the frame rate (e.g., about 30 fps) of the image sensor 230 for the duration (e.g., 1305) that the slow motion is not applied. For another example, the electronic device 101 may insert image frames which are generated by the frame rate converter 310, for the duration that the slow motion is applied.

According to an embodiment, the starting point (e.g., 1315, 1325, or 1335) of the duration that the slow motion is applied may be determined while the moving picture is being photographed or before the moving picture is photographed. For example, the electronic device 101 may control the frame rate from the starting point, in response to the user input. For another example, the electronic device 101 may control the frame rate when the motion of the object is sensed in a region of interest (ROI) of the captured image.

According to an embodiment, the electronic device 101 may determine whether to perform frame rate conversion for the duration that the slow motion is applied, based on a specified condition. The specified condition may include, for example, at least one of illuminance, a motion extent, a residual battery level, or the brightness of an image frame.

For example, when the illuminance is equal to or greater than a specified threshold value, the long exposure time of the image sensor 230 is not required. Accordingly, in operation 1301, the electronic device 101 may change the frame rate of the image sensor 230 to the first frame rate (e.g., 401 of FIG. 4A), from the starting point (e.g., 1315) of the duration (e.g., 1310) that the slow motion is applied and may not perform the frame rate conversion. In this case, the electronic device 101 may obtain image frames at the first time interval 1317. For another example, when the illuminance is less than the specified threshold value, the long exposure time of the image sensor 230 is not required. Accordingly, in operation 1302, the electronic device 101 may change the frame rate of the image sensor 230 to the second frame rate (e.g., 402 of FIG. 4A) slower than the first frame rate (e.g., 402 of FIG. 4A), from the starting point (e.g., 1315) of the duration (e.g., 1310) that the slow motion is applied and may perform the frame rate conversion. In this case, the electronic device 101 may obtain image frames at the second time interval 1327 greater than the first specified time interval 1317.

According to another embodiment, the electronic device 101 may determine whether to perform the frame rate conversion for the duration that the slow motion is applied, based on a user input.

According to an embodiment, the electronic device 101 may terminate the application of the slow motion, when the user input is received, or when the motion of the subject is disappeared in the ROI. According to another embodiment, the electronic device 101 may automatically terminate the application of the slow motion when a specified time is elapsed after the slow motion is started.

Although FIG. 13 illustrates the operation that the electronic device 101 controls the frame rate of the image sensor 230 by comparing the illuminance (or another specified condition) and a single threshold value, the electronic device 101 may determine the frame rate of the frame rate converter 310 by comparing the illuminance with a threshold value according to another embodiment.

According to an embodiment, when the illuminance is less than the threshold value, the number of the image frames obtained from the image sensor 230 may decrease. Accordingly, the storage space of the memory 130 may increase. When the storage space of the memory 130 increase, the electronic device 101 may increase the time in which the moving picture is captured.

According to an embodiment, the electronic device 101 may control the frame rate of the image sensor 230 when the slow motion is applied for a plurality of durations. For example, after the slow motion is applied for the first duration 1320, the electronic device 101 may apply the slow motion for the second duration 1330. According to an embodiment, the electronic device 101 may determine the frame rate of the image sensor 230 for the second duration 1330, based on the frame rate of the image sensor 230, which is applied for the first duration 1320. For example, the electronic device 101 may obtain image frames at a third interval 1337 for the first duration 1320. When the image quality of the obtained image frames is equal to or greater than the threshold value, the electronic device 101 may obtain image frames at the third interval 1337 for the second duration 1320.

According to another embodiment, the electronic device 101 may determine the frame rate of the frame rate converter 310 for the second duration 1330, based on the frame rate of the frame rate converter 310, which is applied for the first duration 1320.

Although FIG. 13 illustrates an example that the electronic device 101 controls the frame rate based on a specified condition for the duration that the slow motion is applied, the electronic device 101 may determine whether to control the frame rate, based on the specified condition for the duration (e.g., 1305) that the slow motion is not applied according to other embodiments.

Figure 14:
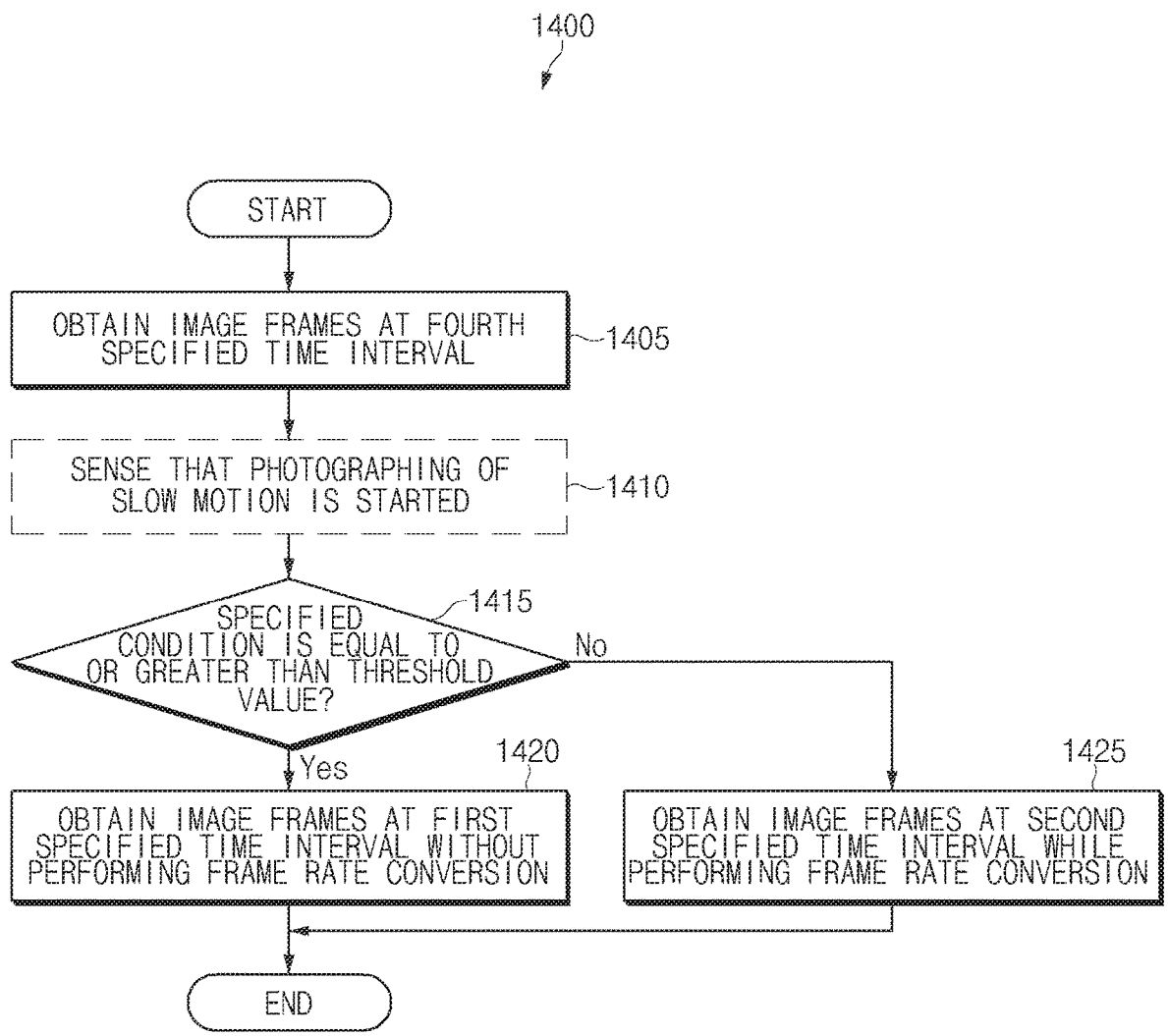
FIG. 14 illustrates a flowchart illustrating an operation of an electronic device to determine a frame rate, according to an embodiment of the disclosure.

FIG. 14 illustrates a flowchart 1400 of an operation of an electronic device to determine a frame rate, according to an embodiment of the disclosure. The operations illustrated in FIG. 13 may refer to an embodiment of operation 705 of FIG. 7.

Referring to FIG. 14, the electronic device 101 may obtain image frames at a fourth specified time interval in operation 1405. The fourth specified time interval may refer to a time interval at which image frames are obtained for a duration (e.g., 1305 of FIG. 13) that slow motion is not applied. When the electronic device 101 skips operation 1410, the fourth specified time interval may correspond to the first specified time interval 410 of FIG. 4A.

In operation 1410, the electronic device 101 may sense that the photographing of the slow motion is started. According to an embodiment, a time point at which the photographing of the slow motion is started may be determined by a user input while the moving picture is being photographed, or may be randomly or by the user input before the photographing of the moving picture is started.

According to various embodiments, the electronic device 101 may omit operation 1410. In other words, the electronic device 101 may perform operation 1415 to operation 1425 for the duration that the photographing of the slow motion is not applied.

In operation 1415, the electronic device 101 may identify whether the specified condition is equal to or greater than a threshold value. The specified condition may include, for example, at least one of illuminance, a motion extent, a residual battery level, or the brightness of an image frame.

When the specified condition is equal to or greater than the threshold value, the electronic device 101 may obtain image frames at the first specified time interval (e.g., 1317 of FIG. 13) without performing the frame rate conversion in operation 1420. According to another embodiment, when the electronic device 101 does not perform operation 1410, the electronic device 101 may not perform operation 710 to operation 725 of FIG. 7.

When the specified condition is less than the threshold value, the electronic device 101 may perform the frame rate conversion and obtain image frames at the second specified time interval (e.g., 1327 of FIG. 13) in operation 1425. According to another embodiment, when the electronic device 101 does not perform operation 1410, the electronic device 101 may control the frame rate by performing operation 710 to operation 725 of FIG. 7.

As described above, an electronic device (e.g., 101 of FIG. 1) may include an image sensor (e.g., 230 of FIG. 3), one or more processors (e.g., 120 of FIG. 1 or 260 of FIG. 3). The one or more processors may sequentially obtain a plurality of image frames including a first image frame (e.g., 450-3 of FIG. 4A), a second image frame (e.g., 450-4 of FIG. 4A), and a third image frame (e.g., 450-5 of FIG. 4A) through the image sensor set at a first specified time interval (e.g., 410 of FIG. 4A), may generate a synthesized image frame (e.g., 460-4 of FIG. 4A by using the first image frame and the third image frame, may identify a similarity between the second image frame and the synthesized image frame, may sequentially obtain a plurality of second image frames through the image sensor set at a second specified time interval (e.g., 420 of FIG. 4A) long than the first time interval, when the similarity satisfies a first specified range, and may sequentially obtain the plurality of second image frames through the image sensor set at the first specified time interval, when the similarity satisfies the second specified range.

According to an embodiment, the one or more processors may be configured to generate a plurality of third image frames by inserting one or more synthesized frames between the plurality of second image frames, as at least a portion of an operation of obtaining the plurality of second image frames through the image sensor at the second specified time interval.

According to an embodiment, the one or more processors may be configured to generate a moving picture using corresponding an image frame among the plurality of second image frames and the plurality of third image frames, and the plurality of first images frames.

According to an embodiment, the one or more processors may be configured to sequentially obtain the plurality of second image frames through the image sensor set at a third specified time interval shorter than the first specified time interval, when the similarity satisfies a third specified range.

According to an embodiment, the one or more processors may be configured to generate the moving picture based on the synthesized image frame instead of the second image frame, when the similarity satisfies the first specified range.

According to an embodiment, the one or more processors may be configured to identify the similarity between the second image frame and the synthesized image frame, based on at least one of Sum of Absolute Difference (SAD), Magnitude of Absolute Difference (MAD), a feature or a keypoint.

According to an embodiment, the one or more processors may include a frame rate converter (FRC) (e.g., 310 of FIG. 3) configured to generate the synthesized image frame, an encoder (e.g., 320 of FIG. 3) configured to generate the moving picture, and a control circuitry (e.g., 330 of FIG. 3) operatively connected with the FRC and the encoder.

According to an embodiment, the control circuitry may be configured to obtain motion vector information for the plurality of first image frames through the FRC, and generate the moving picture based on the motion vector information, through the encoder.

As described above, a method of an electronic device (e.g., 101 of FIG. 1) may include sequentially obtaining a plurality of image frames including a first image frame (e.g., 450-2 of FIG. 4A) and a second image frame (e.g., 450-3 of FIG. 4A) at a first specified time interval (e.g., 410 of FIG. 4A), generating a synthesized image frame (e.g., 460-4 of FIG. 4A) by using the first image frame and the third image frame, identifying similarity between the second image frame and the synthesized image frame, sequentially obtaining a plurality of second image frames at a second specified time interval long than the first specified time interval when the similarity satisfies the first specified range, and sequentially obtaining the plurality of second image frames at the first specified time interval, when the similarity satisfies the second specified range.

According to an embodiment, the sequentially obtaining of the plurality of second image frames at the second time interval includes generating a plurality of third image frames by inserting one or more synthesized image frames into a section between the plurality of second image frames.

According to an embodiment, the method may further include generating a moving picture using corresponding image frames among the plurality of second image frames and the plurality of third image frames, and the plurality of first images frames.

According to an embodiment, the method may further include sequentially obtaining the plurality of second image frames through the image sensor set at a third specified time interval shorter than the first specified time interval, when the similarity satisfies a third specified range.

According to an embodiment, the generating of the moving picture may include generating the moving picture based on the synthesized image frame instead of the second image frame, when the similarity satisfies the first specified range.

According to an embodiment, the identifying of the similarity may include identifying the similarity between the second image frame and the synthesized image frame, based on at least one of Sum of Absolute Difference (SAD), Magnitude of Absolute Difference (MAD), a feature or a keypoint.

According to an embodiment, the sequentially obtaining of the plurality of first image frames may further include obtaining a third image frame after the second image frame, and the generating of the synthesized image frame may include generating a synthesized image frame based on the first image frame and the third image frame As described above, an electronic device (e.g., 101 of FIG. 1) may include an image sensor (e.g., 230 of FIG. 3), and one or more processors (e.g., 120 of FIG. 1 or 260 of FIG. 3). The one or more processors may sequentially obtain a plurality of first image frames including a first image frame (e.g., 450-2 of FIG. 4A) and a second image frame (e.g., 450-3 of FIG. 4A) through the image sensor set at a first specified time interval (e.g., 410 of FIG. 4A), may identify similarity between the first image frame and the second image frame, may sequentially obtain a plurality of second image frames through the image sensor at a second specified time interval (e.g., 420 of FIG. 4A) longer than the first specified time interval when the similarity satisfies a first specified range, and may sequentially obtain the plurality of second image frames through the image sensor set at the first specified time interval, when the similarity satisfies the second specified range.

According to an embodiment, the one or more processors may be configured to generate a plurality of third image frames by inserting one or more synthesized frames between the pluralities of second image frames, as at least a portion of an operation of obtaining the plurality of second image frames through the image sensor at the second specified interval.

According to an embodiment, the one or more processors may be configured to generate a moving picture using corresponding image frames among the plurality of second image frames and the plurality of third image frames, and the plurality of first images frames.

According to an embodiment, the one or more processors may be configured to sequentially obtain the plurality of second image frames through the image sensor set at a third specified time interval shorter than the first specified time interval, when the similarity satisfies a third specified range.

According to an embodiment, the one or more processors may be configured to generate the moving picture based on the synthesized image frame instead of the second image frame, when the similarity satisfies the first specified range.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device may ensure higher image quality in the situation that the moving picture is reproduced at a higher frame rate.

In addition, according to embodiments disclosed in the disclosure, the electronic device may ensure the higher frame rate while reducing power consumption, by controlling the frame rate of the image sensor.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
an image sensor;
at least one processor; and
a memory configured to store instructions which, when executed, cause the electronic device to:
sequentially obtain a first image, a second image, and a third image through the image sensor at a first time interval,
generate a first synthesized image by using the first image and the third image,
identify a similarity between the second image and the first synthesized image, and
sequentially obtain a fourth image, a fifth image, and a sixth image through the image sensor, at a second time interval longer than the first time interval, based on the similarity being equal to or greater than a first threshold value.

2. The electronic device of claim 1, wherein the instructions cause the electronic device to:
generate a second synthesized image using the fourth image and the fifth image;
arrange the second synthesized image between the fourth image and the fifth image;
generate a third synthesized image using the fifth image and the sixth image;
arrange the third synthesized image between the fifth image and the sixth image.

3. The electronic device of claim 1, wherein the instructions cause the electronic device to:
determine whether a specified condition is less than a second threshold value before obtaining the first image, the second image, and the third image,
wherein the specified condition comprises at least one of illuminance measured by a illuminance sensor of the electronic device, a residual battery level of the electronic device, a motion extent of at least one image obtained before obtaining the first image, or brightness of the at least one image.

4. The electronic device of claim 1, wherein the instructions cause the electronic device to:
sequentially obtain the fourth image, the fifth image, and the sixth image through the image sensor at the first time interval or a third time interval shorter than the first time interval, based on the similarity being less than the first threshold value.

5. The electronic device of claim 1, wherein the instructions cause the electronic device to:
generate a moving picture based on the first synthesized image instead of the second image, based on the similarity being equal to or greater than the first threshold value.

6. The electronic device of claim 1, wherein the instructions cause the electronic device to:
identify the similarity between the second image and the first synthesized image, based one at least one of Sum of Absolute Difference (SAD), Magnitude of Absolute Difference (MAD), a feature, or a keypoint, by at least one of:
comparing sub-sampled images of the second image and the first synthesized image with each other, or
comparing a partial region of the second image with a partial region of the first synthesized image.

7. The electronic device of claim 1, wherein the at least one processor comprises:
a frame rate converter (FRC) configured to generate the first synthesized image;
an encoder configured to generate a moving picture; and
a control circuitry operatively connected with the FRC and the encoder.

8. The electronic device of claim 7, wherein the control circuitry is configured to:
obtain motion vector information for the first image, the second image, and the third image, through the FRC; and
generate the moving picture based on the motion vector information, through the encoder.

9. A method of an electronic device, the method comprising:
sequentially obtaining a first image and a second image at a first time interval;
generating a first synthesized image using the first image and the second image;
identifying a similarity between the second image and the first synthesized image; and
sequentially obtaining a third image and a fourth image at a second time interval longer than the first time interval, based on the similarity being equal to or greater than a first threshold value.

10. The method of claim 9, further comprising:
generating a second synthesized image using the third image and the fourth image; and
arranging the second synthesized image between the third image and the fourth image.

11. The method of claim 10, further comprising:
generating a moving picture based on the first synthesized image instead of the second image, based on the similarity being equal to or greater than the first threshold value.

12. The method of claim 9, further comprising:
determining whether a specified condition is less than a second threshold value before obtaining the first image and the second image,
wherein the specified condition comprises at least one of illuminance, a residual battery level of the electronic device, a motion extent of at least one image obtained before obtaining the first image, or brightness of the at least one image.

13. The method of claim 9, further comprising:
sequentially obtaining the third image and the fourth image at the first time interval or a third time interval shorter than the first time interval, based on the similarity being less than the first threshold value.

14. The method of claim 9, wherein the identifying of the similarity includes:
identifying the similarity between the second image and the first synthesized image, based one at least one of Sum of Absolute Difference (SAD), Magnitude of Absolute Difference (MAD), a feature, or a keypoint, by at least one of:
comparing sub-sampled images of the second image and the first synthesized image with each other, or
comparing a partial region of the second image with a partial region of the first synthesized image.

15. The method of claim 9,
wherein the sequentially obtaining of the first image and the second image includes:
obtaining a fifth image after the second image and before the third image, and wherein the generating of the first synthesized image includes:
generating the first synthesized image based on the first image and the fifth image.

16. An electronic device comprising:
an image sensor;
at least one processor; and
a memory configured to store instructions which, when executed, cause the electronic device to:
sequentially obtain a first image and a second image through the image sensor at a first time interval,
identify a similarity between the first image and the second image, and
sequentially obtain a third image and a fourth image through the image sensor at a second time interval longer than the first time interval, based on the similarity being equal to or greater than a first threshold value.

17. The electronic device of claim 16, wherein the instructions cause the electronic device to:
generate one or more synthesized images using the third image and the fourth image; and
arrange the one or more synthesized images between the third image and the fourth image.

18. The electronic device of claim 17, wherein the instructions cause the electronic device to:
generate a moving picture using the first to fourth images and the one or more synthesized images.

19. The electronic device of claim 18, wherein the at least one processor is further configured to:
determine whether a specified condition is less than a second threshold value before obtaining the first image and the second image,
wherein the specified condition comprises at least one of illuminance measured by a illuminance sensor of the electronic device, a residual battery level of the electronic device, a motion extent of at least one image obtained before obtaining the first image, or brightness of the at least one image.

20. The electronic device of claim 16, wherein the instructions cause the electronic device to:
sequentially obtain the third image and the fourth image through the image sensor at the first time interval or a third time interval shorter than the first time interval, based on the similarity being less than the first threshold value.

* * * * *